United States Patent
Bollay et al.

(10) Patent No.: US 8,856,308 B1
(45) Date of Patent: Oct. 7, 2014

(54) CLOUD SCALE AUTOMATIC IDENTITY MANAGEMENT

(71) Applicant: Union Bay Networks, Inc., Seattle, WA (US)

(72) Inventors: Benn Sapin Bollay, Seattle, WA (US); Jonathan Mini Hawthorne, Seattle, WA (US)

(73) Assignee: Union Bay Networks, Inc., Seattle, WA (US)

( * ) Notice: Subject to any disclaimer, the term of this patent is extended or adjusted under 35 U.S.C. 154(b) by 0 days.

(21) Appl. No.: 14/221,070

(22) Filed: Mar. 20, 2014

(51) Int. Cl.
  *G06F 15/173* (2006.01)
  *H04L 9/00* (2006.01)
  *H04L 29/06* (2006.01)
  *H04L 29/12* (2006.01)

(52) U.S. Cl.
  CPC ...................................... *H04L 61/00* (2013.01)
  USPC ........... 709/223; 709/220; 709/225; 713/171; 713/157; 713/169; 380/259

(58) Field of Classification Search
  USPC .................. 709/220–225; 713/157, 169–180; 380/259–260
  See application file for complete search history.

(56) References Cited

U.S. PATENT DOCUMENTS

| | | | |
|---|---|---|---|
| 2004/0103282 A1* | 5/2004 | Meier et al. | 713/171 |
| 2011/0264915 A1* | 10/2011 | Cam-Winget et al. | 713/171 |
| 2012/0072718 A1* | 3/2012 | Ronda et al. | 713/156 |
| 2012/0078915 A1* | 3/2012 | Darcy | 707/747 |

* cited by examiner

*Primary Examiner* — Yasin Barqadle
(74) *Attorney, Agent, or Firm* — John W. Branch; Lowe Graham Jones PLLC

(57) ABSTRACT

Embodiments are directed to towards cloud scale automatic identity management. A floating network may be established using agents operative on hosts across one or more networks. Each node of the floating network is resident on host (computer or cloud instance) that includes an agent configured to perform one or more networking tasks that establish the floating network. Parent nodes may be nodes designated as points in the floating network for adding additional nodes. Accordingly, each parent node includes at least one parent agent that includes at least parent credentials. Agent installers provided to a host may generate a child agent for the host that includes child credentials generated based on its parent credentials. An unambiguous identity value for the new child node may be determined by tracing a trust relationship path from the child node to the root node of the floating network.

30 Claims, 12 Drawing Sheets

CLOUD SCALE AUTOMATIC IDENTITY MANAGEMENT

TECHNICAL FIELD

The present invention relates generally to network configuration management, and more particularly, but not exclusively to network configuration management in cloud networks.

BACKGROUND

Computing applications and services have been increasingly deployed to computing resources that are in cloud networks. There may be many reasons for the migration of services to cloud networks, at least one of which may be the ease of scaling the capacity of computing resources for running the applications and services. Most cloud networks may be configured to automatically provision or decommission computing resources in accordance with the operation demand generated by an application or services. In many cases, provisioned resources are cloud instances comprising virtual machines that may be automatically and rapidly provisioned to accommodate an increased operational load. Likewise, most cloud networks may be configured to automatically and rapidly decommission excess computing resources as the operational load may decrease.

Further, in addition to the dynamic and ephemeral characteristics of cloud network based computing resources, modern networks may be required to support users that may want to add multiple computers to a network. For example, a user may want to participate in a network with one or more computers, such as, desktop computers, laptop computers, smart phones, tablets, or the like. Thus, in some cases, a user may employ several computers at the same time, all requiring specific and/or particular rights to the network. Also, in some cases, the user may be enabled to join networks with their own personal computers rather than being limited to computers that may be provided by the network's owners or administrators.

Accordingly, dynamic networking environments, such as, those that include cloud networks and/or users with multiple computers, may be challenging for configuration and network management tools that may depend on networks to be relatively static. Further, maintaining unambiguous identities for each computing resource in a dynamic networking environment may be difficult as large numbers of cloud instances and/or computers may be automatically joining or leaving the network more or less automatically. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF VARIOUS EMBODIMENTS

Figure 1:
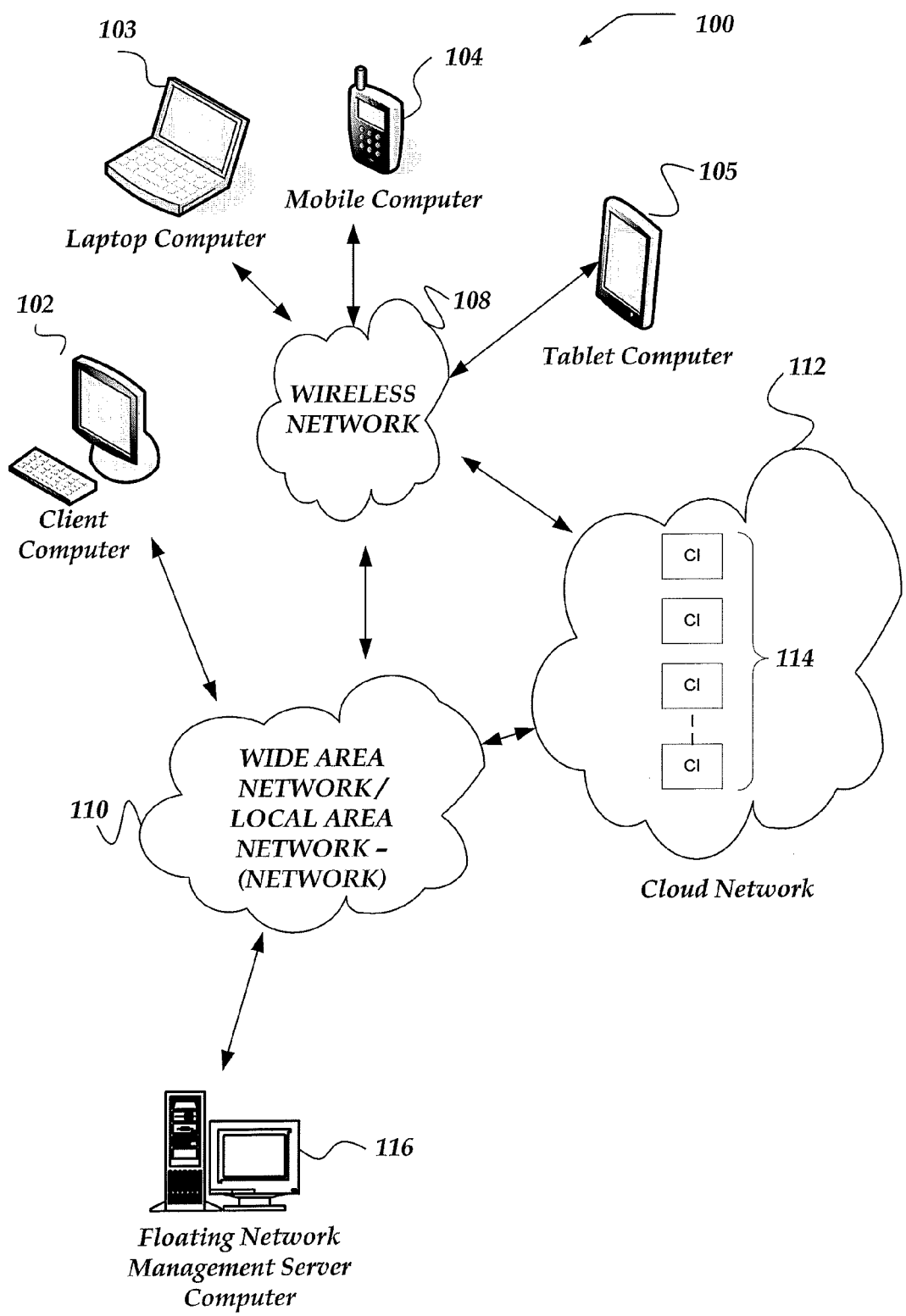
FIG. 1 is a system diagram of an environment in which embodiments of the invention may be implemented.

The present innovations now will be described more fully hereinafter with reference to the accompanying drawings, which form a part hereof, and which show, by way of illustration, specific embodiments by which the invention may be practiced. These innovations may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present innovations may be embodied as methods, computers, or devices. Accordingly, the present innovations may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the innovations may be readily combined, without departing from the scope or spirit of the innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein the term "cloud network" refers to cloud based networked computing environments that usually enable location transparent access to services and/or applications. Cloud networks may be comprised of one or more physical network computers. These physical network computers may be coupled using one or more networks and/or arranged into clusters. In some cases, users may access cloud networks over public networks, such as, the internet. Cloud networks generally made available to the public are sometimes called public cloud networks. In other cases, access to a cloud network may be restricted. This type of cloud network configuration may be called a private cloud network.

Cloud networks may comprise numerous physical computers and storage devices arranged such that the number and arrangement of the physical computers and devices is hidden from the users of a cloud network. Cloud network infrastructure, the details and architecture of which may vary depending on the cloud network provider, automatically provision and deploy applications and services onto the physical hardware transparent to the users of cloud services.

Cloud networks are often arranged to deploy multiple virtual machines that are dynamically provisioned on physical computers to support the various applications and services that are operative in the cloud network. The policy for dynamically provisioning resources in a cloud network may be determined based on configuration information associated with users and/or owners of the applications and/or services that are operative in the cloud network. Cloud networks may be configured to automatically and rapidly scale computing resources in response to changing usage loads.

As used herein the term "cloud instance" refers to an addressable (identifiable) and distinct allocation of computing resources in a cloud network. In many embodiments, cloud instances are virtual servers implemented using one or more virtual machine technologies. In some embodiments, cloud instances may be optimized for particular computing tasks. For example, cloud instances arranged for general purpose computing tasks may be configured differently than cloud instances arranged for graphic processing, or database processing. Cloud networks may be configured to automatically instantiate cloud instances based on various policies generally related to load and usage of the application or services that are hosted in the cloud network the cloud instance. For example, if a e-commerce web site is hosted in a cloud network. Cloud instances may comprise one or more virtual servers that are hosting web servers and databases. Accordingly, the number of provisioned (activated) cloud instances may automatically increase if the load on the e-commerce web site exceeds a defined threshold. Likewise, cloud instances may be automatically decommissioned as load on the e-commerce website decreases.

As used herein the terms "image," or "cloud instance image" refers to a preconfigured base data and information used for instantiating cloud instances and/or other virtualized computers. Typically, an image may include static data such as an operating system, applications, configuration files, file systems, application data, or the like. Image may be generated by taking a "snapshot" of a current running and/or configured cloud instance or virtualized computer. Such images may used in a "cookie cutter" fashion to clone other running images that include the same operating system, applications, configurations, or the like. Image may be pre-loaded with applications that enable them to perform particularized roles in a networked environment. For example, some images may be designed to produce running instance of web servers, while other images may be designed to produce running instances of database server.

As used herein the terms "host," "host computer" refer to computing resources, such as, a client computer, network computer, virtual machine, cloud instance, or the like. The term host is used for brevity and generally refers to the physical computers and/or virtual computers that may in some cases be configured to host nodes for a floating network.

As used herein the term "agent" refers to an application, module, library, or device that is deployed on a host that may enable nodes to participate and/or join a floating network. Agents may be arranged to provide network management services for its host. In at least one of the various embodiments, agents may be arranged to employ one or more well-known techniques for integration with the network services facilities of a host operating system. Agents that are installed and operative on a host may enable the host provide a node in a floating network. In at least one of the various embodiments, agents may be arranged to provide a variety of network management services for nodes in a floating network, including, but not limited to, network protocol stacks, firewall services, network address translation (NAT), network traffic steering, bandwidth management, proxy services, network application monitoring, access control, monitoring, reporting, or the like.

Agents may be deployed in a variety of configurations, including: a software library integrated with one or more applications that are operative on a host; an independent process or program running on the host; integrated into a hypervisor, enabling managed virtual machines to host nodes for a floating network; operative as a software defined gateway enabling floating network connectivity with hosts that may not include agents; as a hardware appliance (e.g., network computer) that enables connectivity to one or more floating networks; or the like.

As used herein the "credentials" refers to information that is used for unambiguous identification of entities or items in a network. In some embodiments, cryptographic techniques may be employed to generate credentials for establishing the identity of parties that are in communication over a network, including, users, nodes, agents, host computers, or the like. In at least one of the various embodiments, credentials may comprise machine-readable cryptographic keys, passwords, certificates, or the like. In at least one of the various embodiments, credentials may be self-issued, or issued by a trusted third party. For example, an X.509 certificate and a corresponding private key is a credential that may be generated using well-known cryptographic techniques.

As used herein the term "agent installer" refers to a program or application that is arranged to install agents on hosts. Separate agent installers may be generated for installing agents on different kinds of hosts. In some cases, each agent may be arranged to act as an agent installer. In some embodiments, agents may be arranged to generate agent installers. In other embodiments, agent installers may be generated using a centralized server computer, such as a floating network management server, and provided to the hosts.

As used herein the term "floating network" refers to one or more dynamic networks which may or may not have connectivity with each other in whole or part. In some embodiments, a floating network may be the administrative and management domain for participating nodes. In some cases, floating networks may include one or more components that may be managed by multiple floating networks. In at least one of the various embodiments, one or more portions of a floating network may be defined by the installation and configuration of one or more agents on hosts. In at least one of the various embodiments, floating networks may enable disjoint networks, network devices and/or computers to communicate. Nodes may join and/or leave a floating network based in part on the installation, activation, and/or configuration of one or more agents on one or more hosts.

Further, in at least one of the various embodiments, a floating network may be arranged to enable dynamic policies for communication between two or more applications (which may be Open Systems Interconnection (OSI) Layer Seven constructs), between two or more cloud networks (which may be disparate OSI Layer Three networks). Accordingly, in at least one of the various embodiments, a floating network may provide dynamic syntax, transformation, encryption, session, transport, end-to-end connection, reliability, path determination, logical addressing, or the like, across multiple layers of a network stack. Also, administrative configuration and/or network policies may be operative to dynamically include or exclude a node or host from participating and/or communicating with a floating network or portions of a floating network. In at least one of the various embodiments, network policies may be operative to manipulate and/or transform communication/network traffic between and/or among nodes of a floating network.

As used herein the term "node" refers to a logical endpoint in a floating network. Nodes may be resident on various hosts, including, but not limited to, physical or virtual computers, client computers, network computers, cloud instances, mobile computers, mobile telephones, tablet computers, or the like, that may be participating in floating network. Nodes may include one or more agents that may be configured and/or credentialed for one or more floating networks. In some embodiments a host may be arranged to include nodes from two or more floating networks at the same time.

As used herein the term "root node" refers to the top level node in a floating network. In at least one of the various embodiments, the root node may be used to at least generate credentials that may be used in part to generate descendant credentials for other nodes in the floating network and to authenticate other nodes within the floating network. In at least one of the various embodiments, a root node may be a logical construct referenced and/or defined within a management system rather than being an actual node of the floating network.

As used herein the terms "parent node," and "child node" are used for brevity for describing the relationship between two or more nodes of a floating network. For a given node in a floating network, its child nodes are nodes that directly descend from it (if any). And, for a given node, its parent node is the node that provided information used to generate it. Nodes in a floating network will always have a parent node. Likewise, nodes used to generate new nodes will have child nodes.

As used herein the terms "parent agent," and "child agent" are used for brevity for describing the relationship between two or more agents in a floating network. The use of these terms follows the parent/child pattern described above for parent node/child node, but for agents.

As used herein the terms "parent credentials and "child credentials" are used for brevity for describing the relationship between two or more credentials in a floating network. The use of these terms follows the parent/child pattern described above for parent node/child node, but for credentials.

As used herein the terms "genealogy" or "node genealogy" refer to a representation of a line of descent for a node in a floating network. For example, the line of descent for a node may be traced from a terminating node, such as, the root node of a floating network to the node of interest. Likewise, a line of descent for a node may be traced upwards from the node of interest to a terminating node. Tracing the genealogy of a node from terminating node involves tracing from parent node to child node until the node of interest is reached. Whereas, tracing the genealogy of a node upwards to the terminating node involves tracing from child node to parent node, starting at the node of interest, until the terminating node may be reached. Nodes that intervene between the node of interest and the terminating node contribute to the genealogy of the node of interest.

In at least one of the various embodiments, the credentials/signatures for the entire line of descent between a node and the root node may not be stored, or may be otherwise unavailable. In these cases, in at least one of the various embodiments, only some of the intermediate nodes are relevant. Accordingly, a portion of the entire line-of-descent may be employed as a pattern match or a fingerprint for relevant nodes. Also, some of the nodes may represent actions performed—such as having successfully completed a handshake to join a floating network or maintaining a healthy node state while processing network traffic over a certain time period.

In at least one of the various embodiments, if the genealogy is relevant all the way to the root node, identity management may employ a centralized trust model. Whereas in embodiments where genealogy is only relevant for a limited set of nodes (e.g., a portion of the line of descent) identity management may employ web-of-trust or reputation score model. In such embodiments, non-conforming nodes diverge from their policy fingerprint as their genealogy fails to match the expected genealogy pattern and so become less trusted over time naturally without requiring a centralized management component.

As used herein the term "terminating node" refers to a node in a floating network that is the end of a traversal path corresponding to a genealogy pattern. In some cases, the terminating node may be a root node. For example, if determining a genealogy of a node, the path from the node to the terminating node may used for matching defined genealogy patterns used for determining trust.

As used herein the term "hardware security module" refers to a hardware device or computer arranged for providing additional safeguards for storing and using security/cryptographic information such as, keys, digital certificates, passwords, passphrases, two-factor authentication information, personal identification numbers, or the like. In some embodiments, hardware security modules may be employed to support one or more standard public key infrastructures (PKI), and may be employed to generate, manage, and/or store keys pairs, or the like. In some embodiments, hardware security modules may be arranged and/or configured as stand-alone network computers, in other cases, they may be arranged as hardware cards that may be added to a computer. Further, in some cases, hardware security modules may be arranged as a portable computer, and/or incorporated into client computers.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed to towards cloud scale automatic identity management. In at least one of the various embodiments, a floating network may be established using distributed agents that may be operative on one or more hosts across one or more networks. In at least one of the various embodiments, each floating network may have a root node and from the root node descendent nodes may be generated. Hosts that include agents and credentials for a floating network may be enabled to participate as a node on the floating network.

In at least one of the various embodiments, each node in a floating network may be determined to be parent node for adding nodes (child nodes) to the floating network. Accordingly, in at least one of the various embodiments, each parent node corresponds to at least one parent agent and at least parent credentials.

In at least one of the various embodiments, one or more hosts may be determined for adding nodes to the floating network. A host may be a cloud instance that may be determined automatically based on configuration policy, or another computer determined by user and/or configuration policy. In at least one of the various embodiments, an agent installer that includes at least a portion of the credentials for a selected parent node may be provided to the host. In at least one of the various embodiments, the provided agent installer may be employed and/or arranged to generate at least one child agent for the at least one host such that the at least one child agent includes child credentials based in part on the at least portion of the parent credentials.

In at least one of the various embodiments, the child agent may be arranged to perform actions that at least enable the host to become a node on the floating network. In at least one of the various embodiments, an unambiguous identity value that corresponds to the child node may be determined based in part on tracing a trust relationship path from the child node to the parent node and to the root node of the floating network such that other nodes that may be intervene between the parent node and the root node contribute information to the unambiguous identity value. Accordingly, in at least one of the various embodiments, a floating network management server may apply one or more policies to the child nodes based on in part on its unambiguous identity value.

In at least one of the various embodiments, once the child agent has been generated the parent credentials may be deleted from the host after the child credentials are generated.

In at least one of the various embodiments, the agent installer may be installed on an image used for instantiating cloud instances. The agent installer may be executed automatically on each cloud instance if a cloud instance is instantiated such that a child agent may be installed on instantiated cloud instances enabling them to automatically become nodes on the floating network.

In at least one of the various embodiments, generating a child agent for a host may further comprise employing the parent credentials for generating the child credentials such that the generated child credentials may be unique for each node even though they are related to the parent credentials. For example, if several child nodes are generated from the same parent node, each child credential (for each child node) may be unambiguously identifiable rather being a copy of credentials that may be copied or shared to each new child node.

In at least one of the various embodiments, another agent installer associated with another floating network may be provided to a host that includes a node for an first floating network. Child agents associated with another floating network may be generated for the host. Accordingly, in at least one of the various embodiments, the child agents associated with the other floating network may enable the host to become a node on the other floating network while simultaneously remaining a node on the first floating network.

In at least one of the various embodiments, a user may be enabled to download an agent installer onto a client computer such that the downloaded agent installer may be employed to generate another agent that enables the client computer to become a node on the floating network.

In at least one of the various embodiments, a hardware security module may be arranged to generate the child credentials for a child node and provide them to a host such that the credentials used for generating the child credentials may remain on the HSM rather than being copied to the host.

In at least one of the various embodiments, the nodes in the floating network may be authenticated based on the genealogy of the credentials included in their agents, the parent credentials, and the credentials for each agent that may be intervening between the parent node and a terminating node.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, one or more cloud networks, such as, cloud network 112, one or more cloud instances, such as cloud instances 114, client computers 102-105, and Floating Network Management Server Computer 116.

At least one embodiment of client computers 102-105 is described in more detail below in conjunction with FIG. 2. In one embodiment, at least some of client computers 102-105 may operate over one or more wired and/or wireless networks, such as networks 108, 110, and/or 112. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, kiosk, point-of-sale, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, floating network management server computer 116, or other computers.

Client computers 102-105 may further be configured to include a client application that enables an end-user to log into an end-user account that may be managed by another computer, such as floating network management server computer 116, cloud instances 114, or the like. Such an end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client computers 103-105 and its components with network 110 and/or cloud network 112. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, cloud network, cloud instance, or the like.

Network 110 is configured to couple network computers with other computers, including, floating network management server computer 116, client computers 102-105 through wireless network 108, cloud network 112, cloud instances 114, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Cloud network 112 may be a public or private cloud network. Cloud network 112 may comprise multiple physical network computers, interconnected by one or more networks, such as, networks similar to and/or including network 108 and/or wireless network 110. Cloud network 112 may enable and/or provide one or more cloud instances. For example, cloud instances 114 may be operative in cloud network 112. The number and composition of cloud instances 114 may be vary depending on the demands of individual users, cloud network arrangement, operational loads, performance considerations, application needs, operational policy, or the like. In at least one of the various embodiments, the number of cloud instances may be automatically increased or decreased in response to demand variance for services by provided by cloud instances running in the cloud network.

Cloud instances 114 may be virtualized embodiments of network computer 300. Further, one or more cloud instances 114 may be operative on physical network computers, such as network computer 300. Cloud instances that may be operative on a network computer, such as, network computer 300 may be managed by a hypervisor, such as hypervisor 319. Further, cloud instances 114 may be arranged to use various computer operating systems. And, cloud instances running different computer operating systems may be operative in the same cloud network.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of floating network management server computer 116 is described in more detail below in conjunction with FIG. 3. Briefly, however, floating network management server computer 116 includes virtually any network computer capable of managing the identities of nodes and/or configuring agents, generating agent installers, configuring floating network policies, for one or more floating networks.

Although FIG. 1 illustrates floating management server computer 116 as a single computer, the innovations and/or embodiments are not so limited. For example, one or more functions of floating management server computer 116 may be distributed across one or more distinct network computers. Moreover, floating network management server computer 116 is not limited to a particular configuration. Thus, in one embodiment, floating network management server computer 116 may be implemented using a plurality of network computers. In other embodiments, the floating network management server computer 116 may operate as a plurality of network computers within a cluster architecture, a peer-to-peer architecture, or the like. Further, in at least one of the various embodiments, a floating network management server computer may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
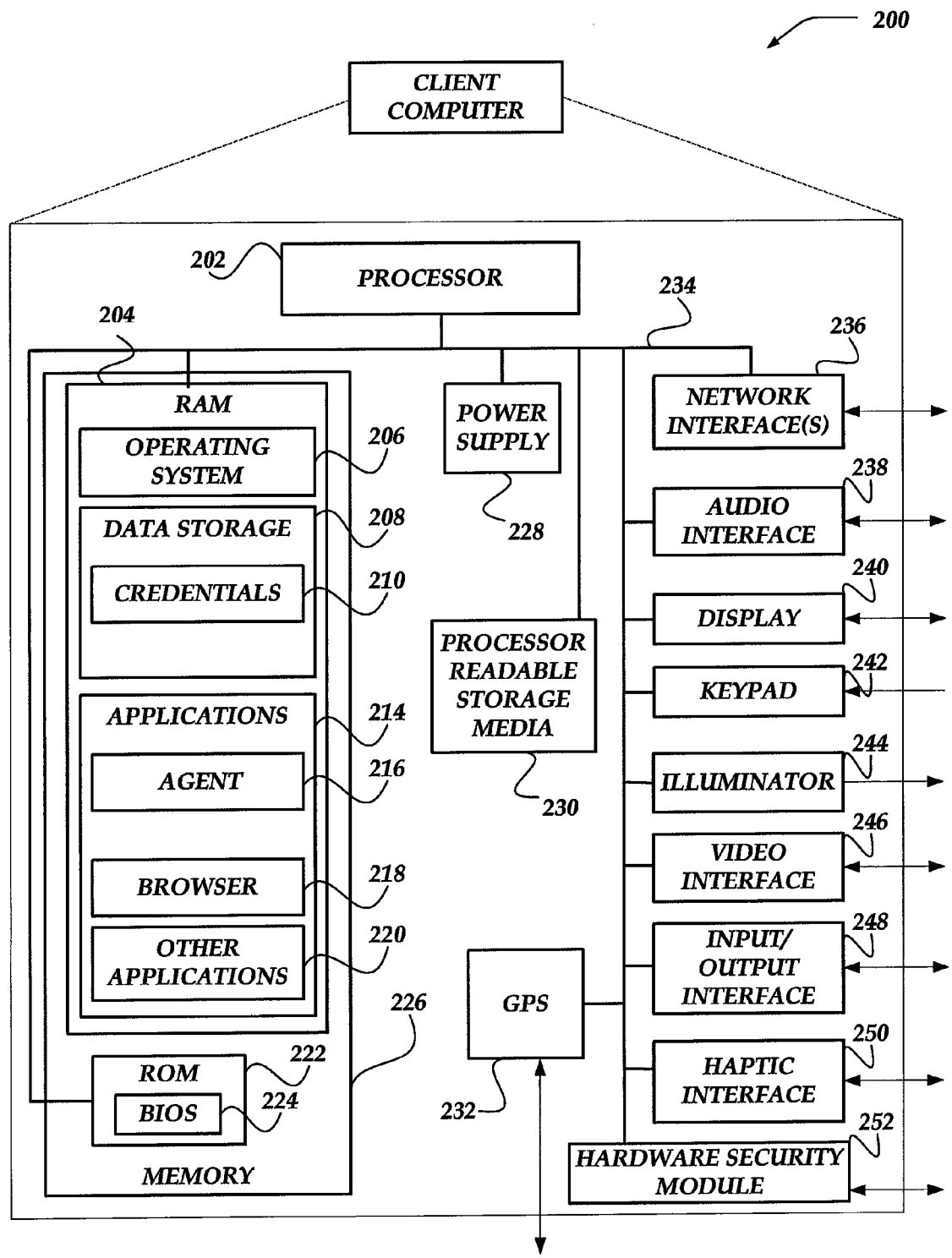
FIG. 2 shows an embodiment of a client computer that may be included in a system such as that shown in FIG. 1.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, hardware security module 252, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Further, client computer 200 may also comprise hardware security module (HSM) 252 for providing additional safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 252 may be a stand-alone client computer, in other cases, HSM 252 may be arranged as a hardware card that may be added to a client computer.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX™, or Linux, or a specialized client communication operating system such as Microsoft Corporation's Windows Mobile™, Apple Corporation's iOS™, Google Corporation's Android™ or the Symbian® operating system, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. Further, data storage 208 may be used for storing credentials 210 that may be employed for authenticating a node with one or more floating networks.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitive, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, a browser 218, and other applications 220.

Further, applications 214 may include one or more agents, such as agent 216 that may enable client computer 200 to participate in one or more floating networks.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as floating network management server computer 116 shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Illustrative Network Computer

Figure 3:
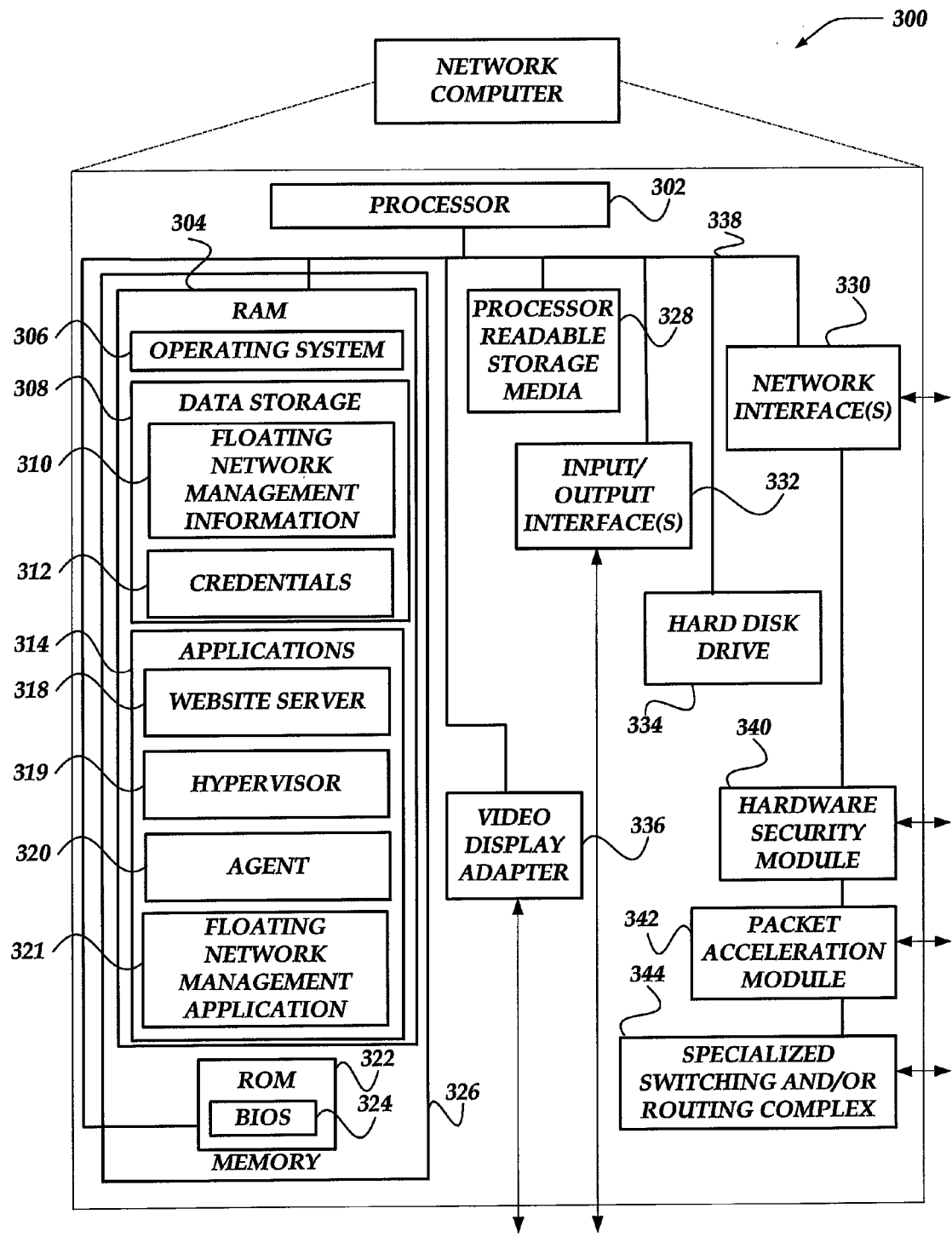
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example floating network management server computer 116, and/or other network computers.

Network computer 300 includes processor 302, processor readable storage media 328, network interface unit 330, an input/output interface 332, hard disk drive 334, hardware security module 340, packet acceleration module 342, specialized switching and/or routing complex 344, video display adapter 336, and memory 326, all in communication with each other via bus 338. In some embodiments, processor 302 may include one or more central processing units.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Further, network computer 300 may also comprise hardware security module (HSM) 340 for providing additional safeguards for generating, storing and/or using security/cryptographic information such as, keys, digital certificates, passwords, passphrases, two-factor authentication information, personal identification numbers, or the like. In some embodiments, hardware security module may be employed to support one or more standard public key infrastructures (PKI), and may be employed to generate, manage, and/or store keys pairs, or the like. In some embodiments, HSM 340 may be a stand-alone network computer, in other cases, HSM 340 may be arranged as a hardware card that may be added to a network computer.

In at least one of the various embodiments, network computer 300 may be arranged such that some or all network traffic may be processed by components such as packet acceleration module 342, specialized switching and/or routing complex 344 rather than network interface(s) 330. Accordingly, in at least one of the various embodiments, properties of network traffic processed by packet acceleration module 342, specialized switching and/or routing complex 344, or the like, may be communicated to other applications and/or components of network computer 300, such as, floating network management application 321, memory 326, or the like, over bus 338. Likewise, in at least one of the various embodiments, information from packet acceleration module 342, specialized switching and/or routing complex 344, or the like, may be communicated to other applications, computers, networks, or the like, by employing one or more standard communication/network protocols such as, OpenFlow, or the like.

In at least one of the various embodiments, some or all of the network traffic provided to network computer 300 may be verified, signed, decrypted, encrypted, replicated (mirrored), or the like by components, such as, packet acceleration module 342, specialized switching and/or routing complex 344, or the like, in a manner transparent (invisible) to operating system 306, hypervisor 319, applications 314, or the like. In at least one of the various embodiments, hardware security module 340 may be employed in conjunction with components, such as, packet acceleration module 342, specialized switching and/or routing complex 344, or the like, to provide additional security.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may include floating network management information 310. In at least one of the various embodiments, floating network management information 310 may include, floating network configuration information, such as, network policy, firewall information, user profiles, packet routing policy, application policy, agent installers, agent credential information, or the like. Furthermore, data storage 308 may be used for storing credentials 312 that may be employed for authenticating a node with one or more floating networks.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318, hypervisor 319, one or more agents, such as agent 320, or floating network management application 321.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Illustrative Logical System

Figure 4:
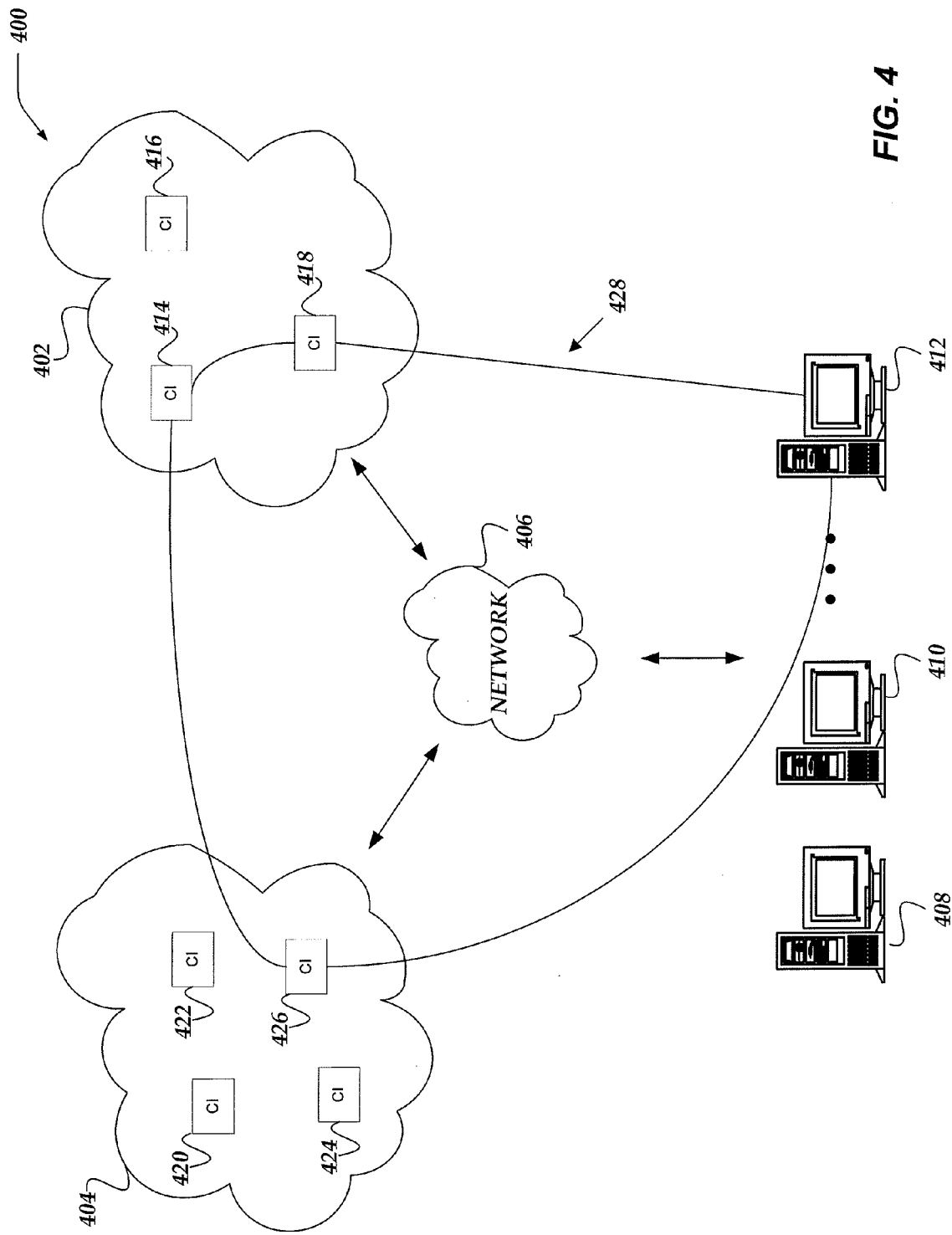
FIG. 4 shows a logical diagram of a system for cloud scale automatic identity management in accordance with at least one of the various embodiments.

FIG. 4 shows a logical diagram of system 400 for cloud scale automatic identity management in accordance with at least one of the various embodiments. This figure is provided to briefly illustrate an overview view of at least one of the various embodiments of a floating network. In at least one of the various embodiments, cloud network 402 and cloud network 404 may be coupled using one or more networks, such as, network 406. Network 406 may be arranged to be substantially similar to network 110. Further, in at least one of the various embodiments, network computers, such as, network computer 408, 410, or 412 may be coupled to one or more cloud networks, such as, cloud network 402 and cloud network 404 using one or more networks, such as, network 406. For this example, network computers 408, 410, and 412 may be substantially similar to network computer 300. And, cloud networks 402 and 404 may be substantially similar to cloud network 112. Also, in at least one of the various embodiments, although not shown in FIG. 4, other computers, such as, client computers, mobile computers, tablet computers, laptop computers, or the like, may be similarly coupled to cloud network 402 and/or cloud network 404.

In at least one of the various embodiments, each cloud network may have one or more cloud instances operating within them. For example, in at least one of the various embodiments, cloud network 402 may include cloud instance 414, cloud instance 416, cloud instance 418, or the like. And, in at least one of the various embodiments, cloud network 404 may include cloud instance 420, cloud instance 422, cloud instance 424, cloud instance 426, or the like. For this example, these cloud instances may represent cloud instances made available by their respective cloud network.

In at least one of the various embodiments, cloud network 402 and cloud network 404 may represent logically or physically separate cloud networks. In some cases, the cloud networks may be operated by the same or different cloud service/environment vendors. Also, in at least one of the various embodiments, one or more of the cloud networks may be private cloud networks while in other cases, one or more of the cloud networks may be public cloud networks.

In at least one of the various embodiments, floating network 428 represents the defined floating network that includes four nodes residing on network computer 412, cloud instance 418, cloud instance 414 and cloud instance 426. Floating network 428 may be arranged to enable its nodes to communicate and to identify each node of the floating network subject to one or more defined network policies. For example, floating network 428 may be configured and arranged to enable its members to transparently interact with each other as if they were on the same network, LAN, or sub-network even though they may be located on different networks. In at least one of the various embodiments, this transparent network functionality may be enabled by one or more agents that are operative on each node in floating network 428. The agents (not shown) at least enable network traffic to be communication between and among the nodes in the floating networks.

Figure 5B:
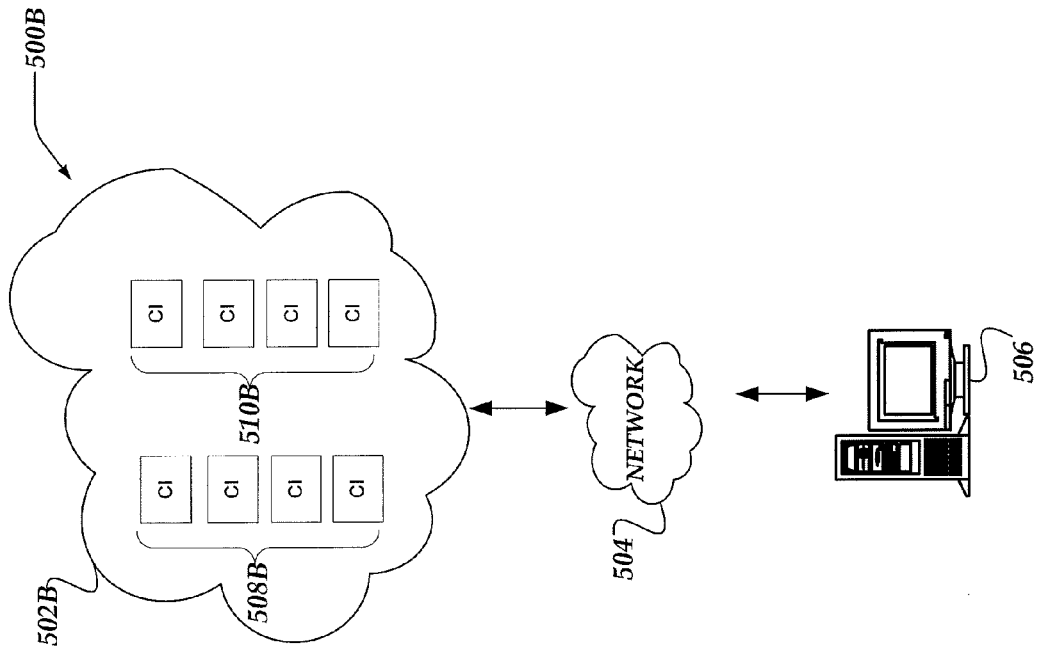
FIGS. 5A and 5B show two views of a logical architecture for a system for cloud scale automatic identity management in accordance with at least one of the various embodiments.
Figure 5A:
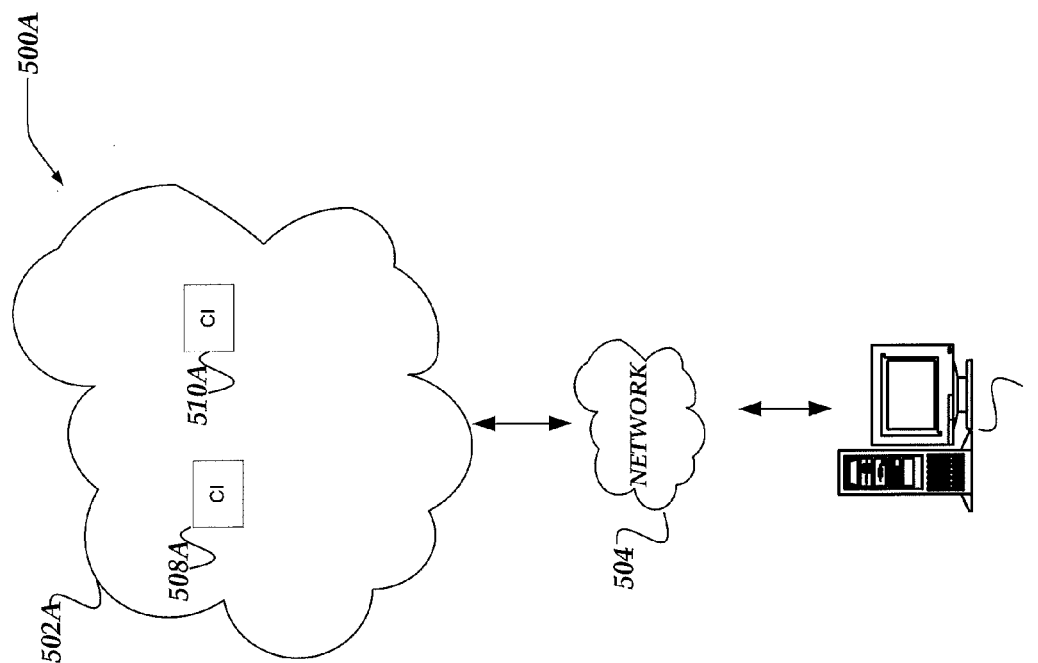

FIGS. 5A and 5B show logical architectures for system 500A and 500B for cloud scale automatic identity management in accordance with at least one of the various embodiments. FIG. 5A shows system 500A before cloud scaling has occurred and FIG. 5B shows system 500B after cloud scaling has occurred for at least one of the various embodiments.

FIG. 5A shows system 500A that includes cloud network 502A, network 504, and network computer 506. Further, cloud instance 508A and cloud instance 510A may be arranged for providing one or more services from cloud network 502A. For example, cloud instance 508A may be arranged to be operative as a web server and cloud instance 510A may be arranged to be a database server. Though, clearly, other services may be provided and other cloud instance configurations are possible without departing from the scope of these innovations.

In this example, in at least one of the various embodiments, network computer 506 may be arranged to request services (e.g., HTTP requests) from cloud instance 508A and/or database requests from cloud instance 510A over network 504. If the cloud instances operative in cloud network 502A are insufficient to service the requests from network computer 506, cloud network 502A may be configured to automatically increase (provision) the number of cloud instances.

FIG. 5B shows system 500B that shows automatic cloud scaling. Accordingly, the number of cloud instances in cloud network 502B have been automatically scaled up to handle the service requests from one or more computers that may be generating requests, such as, network computer 506. Accordingly, for example, cloud instances 508B illustrate an increased number of cloud instances for providing web server services. Likewise, for example, cloud instances 510B represent an increased number of cloud instances for providing database services.

In at least one of the various embodiments, cloud networks may be generally characterized as enabling rapid and inexpensive provisioning of computing resources (cloud instances) and cheap de-provisioning of those same computing resources.

Figure 6:
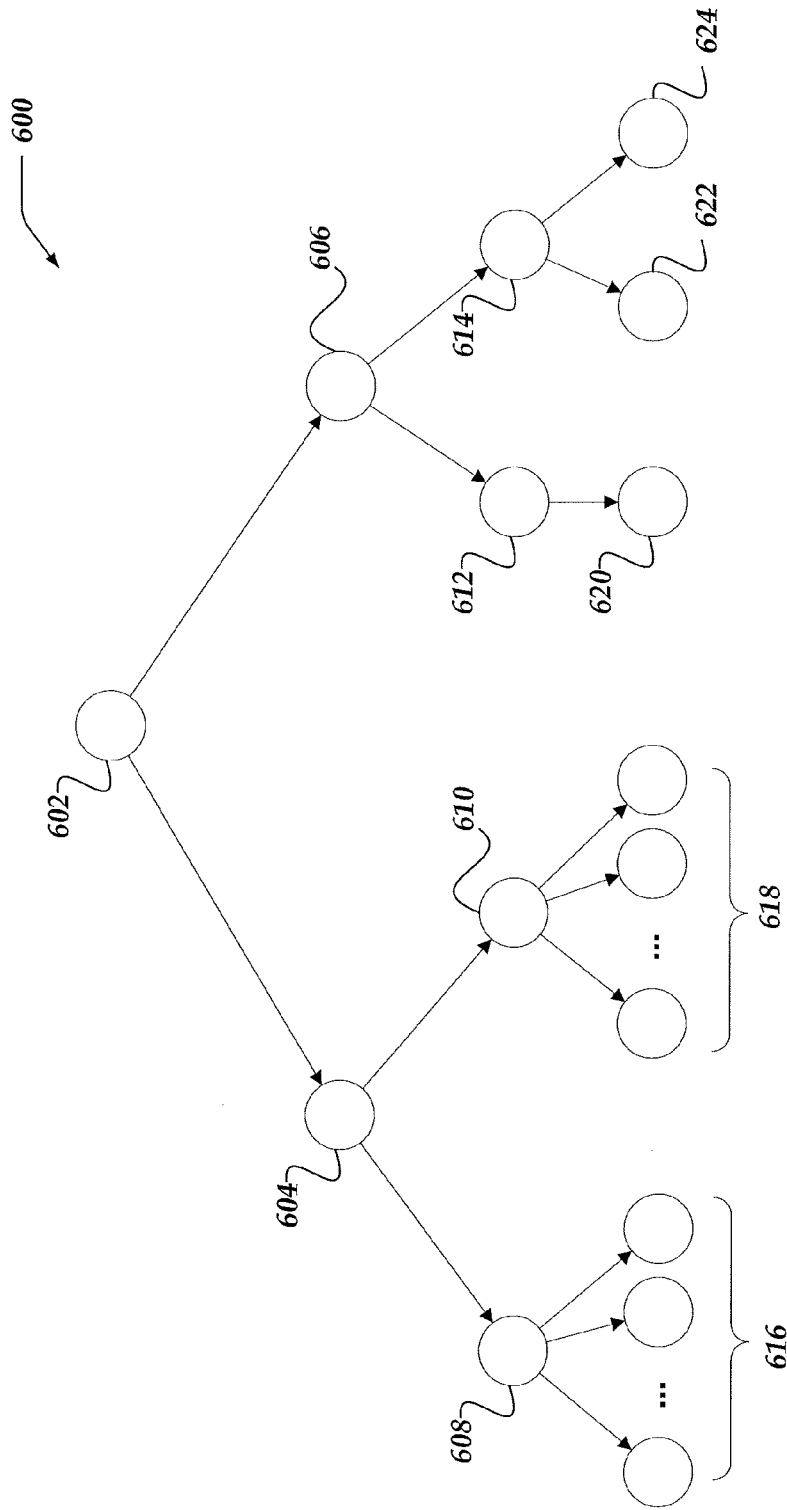
FIG. 6 shows an overview of architecture for a floating network in accordance with at least one of the various embodiments.

FIG. 6 shows an overview of architecture for floating network 600 in accordance with at least one of the various embodiments. Nodes 602-624 may represent nodes in floating network 600. This illustration of floating network 600 will be used illustrate use cases and features of a floating network in accordance with at least one the various embodiments. One of ordinary skill in the art will appreciate that these use cases and/or features are non-limiting and are presented here to facilitate a further understanding of cloud scale automatic identity management in accordance with at least one of the various embodiments rather than limit its application. Accordingly, floating networks may be arranged to have more or less nodes than are shown in floating network 600. Further, nodes in floating networks may be arranged in various and/or different configurations consistent with the specific requirements of a particular floating network.

In at least one of the various embodiments, the various nodes in floating network 600 may be operative on hosts, such as, cloud instances, client computers, network computers, mobile computers, or the like. For this example, node 602 may be considered a root node, it may be designated as such during the configuration of floating network 600. In some embodiments, node 602, the root node in this example, may be a floating network management server, such as floating network management server 116. Further, as shown in FIG. 4, nodes may be resident on hosts located on different cloud networks or different physical networks.

In this example, nodes 616 and nodes 618 illustrate the dynamic provisioning of cloud instances in the cloud network. Accordingly the number of child nodes attached to node 608 may vary depending on the number of cloud instances needed to satisfy the scaling requirements of the provided services and/or applications. Likewise, in this example, the number of child nodes attached to node 610 may vary. For some large cloud network hosted applications, the number of dynamically provisioned cloud instances joining the floating network may increase significantly during periods of peak operational load and then reduce to a much smaller number during slower periods with excess cloud instances being automatically de-provisioned. In at least one of the various embodiments, the agents and credentials associated with the floating network and/or the floating network management server may be arranged to enable the seamless addition of nodes to the floating network and seamless removal of nodes from the floating networks.

In at least one of the various embodiments, hosts, such as, personal and mobile computers operated by authorized users may join floating network 600 such that their mobile computer participates as a node in the floating network. For example, in at least one of the various embodiments, node 612 and node 614 may be configured for enabling one or more user computers to join the floating network. Accordingly, in this example, the computers for users (hosts) that have joined the floating network may be represented by node 620, which is a child node of node 612, and node 622 and node 624 which are both child nodes of node 614. For some embodiments, node 620 may be hosted by a desktop computer of a user. Likewise, node 622 may be hosted on a desktop computer for a user and node 624 may be hosted on a mobile computer for the same user.

In at least one of the various embodiments, as a pre-requisite of participating in floating network 600, each host needs to include an agent with the proper credentials. As described above, agents may be applications, processes, libraries, or the like, that enable the host computers to host nodes for the floating network. Agents operative on the hosts enable nodes to communicate with each other within floating network 600. Further, in at least one of the various embodiments, agents may be arranged to enable floating network nodes to identify each other.

In at least one of the various embodiments, agents may be arranged to employ one or more well-known privileged and/or user-level networking features of the host computer operating system. In some embodiments, during installation, agents may modify some or all of the network settings and configurations of their host computer (including virtual machines and/or cloud instances) to enable the host computer to host a node on the floating network. In some cases, the agent may be arranged to install additional customized software on its host that enables the necessary networking operations.

In at least one of the various embodiments, floating network 600 may be arranged such that each agent is generated using an agent installer application that includes credential information from its parent node. For example, in at least one of the various embodiments, an agent installer that includes credential information corresponding to node 602 may be used for installing agents on hosts for node 604 and for node 606. Here, for this operation, node 602 may be considered a parent node and node 604 and node 606 may be considered child nodes. Likewise, agents for nodes 618 may be installed on hosts using an agent installer that includes credential information of their parent node, node 610.

In at least one of the various embodiments, agent installers may generate and/or configure an agent that enables a host computer to host nodes that may join the floating network. In at least one of the various embodiments, each agent in the floating network may include credentials that may be used to authenticate the node enabling it join the floating network. Further, in at least one of the various embodiments, the credentials may be employed to unambiguously identify the agent and/or the node within the floating network.

In at least one of the various embodiments, the agent installer may generate credentials for identifying the node based on the parent node credential information that may be included in the agent installer. Upon generation of the credentials for the new node, the included parent credentials may be deleted or otherwise removed from the host where the new node resides. In at least one of the various embodiments, one or more well-known cryptographic techniques may be employed for generating the credentials for identifying and/or authenticating the nodes. For example, in at least one of the various embodiments, the credentials may be cryptographic certificates compatible with one or more cryptographic certificate standards, such as, X.509, or the like. Accordingly, in at least one of the various embodiments, the credentials for each node may be traced back through to the parent node that provided its credential information. Thus, in at least one of the various embodiments, each node in the floating network may be linked together in a trust hierarchy based at least on the genealogy of its credentials.

In at least one of the various embodiments, the method for adding a node to a floating network may vary depending on the characteristics of the host and how the agent installer may be provided. For example, in at least one of the various embodiments, a user may be enabled to download an agent installer that includes the necessary parent credential information. The user may then install an agent on the host using the provided agent installer enabling the host computer to host a node the floating network.

In other embodiments, such as, cloud instances, an agent installer may be included in the base image that is used to for provisioning and/or activating the cloud instance. As the cloud instance boots up or otherwise initiates itself as part of joining a cloud network, it may be configured to automatically launch the agent installer. Thus, the agent installer may generate an agent that enables the cloud instance to automatically begin hosting a node on the floating network.

Not unlike cloud instance embodiments, in at least one of the various embodiments, images used for provisioning virtual instances/machines managed by a hypervisor may include an agent installer that may be configured to automatically launch the first time the virtual instance/machine boots up or otherwise activates. Accordingly, in at least one of the various embodiments, the agent installer may generate an agent that enables the virtual instance to automatically begin hosting a node on the floating network.

In at least one of the various embodiments, a hardware security module (HSM), such as, HSM 252 or HSM 340, may be employed to generate node credentials. Accordingly, in at least one of the various embodiments, the HSM may contain the relevant parent credentials to generate the child credentials onboard the HSM. After, the child credentials are created they may be provided to the host where the child resides.

In at least one of the various embodiments, using the HSM for credential generation may at least enable child credentials to be created without having to copy the parent credentials, even temporarily, to the host where the new child node will reside. For example, the HSM may include the relevant private keys (for a parent node or root node) for signing the child credentials. Thus, the child credentials may be signed by the node's parent without exposing the parent's private key.

Further, in at least one of the various embodiments, for brevity nodes in system 600 may be described in terms of parent and child relationships. In this example, node 602 may be described as the root node that includes a root agent and root credentials. Node 604 may be described as a child node of root node 602 and as a parent node of nodes 608 and node 610. Likewise, node 604 may include an agent that is a child agent of a parent agent on root node 602 and it may include credentials that may be considered child credentials of parent credentials of root node 602. Accordingly, in at least one of the various embodiments, nodes in the floating network, except the root node, are child nodes that have parent nodes, parent agents, and parent credentials.

In at least one of the various embodiments, structure of the floating network may be defined by the nodes and thus it may be independent of any underlying physical networks, logical networks, virtual hosts, physical hosts, or the like. Accordingly, as discussed above, a floating network may span multiple networks, where nodes in a single floating network may be resident on different physical networks.

In at least one of the various embodiments, connectivity between and among nodes in the floating network may be facilitated by the agents associated with each node and installed on the hosts. Likewise, the credentials associated with a node may be employed to authenticate and/or identify the nodes within the floating network.

In at least one of the various embodiments, installing an agent with the proper credentials onto a host (of any type) enables a node to be created, activated, and joined with the floating network. Likewise, removing an agent, revoking credentials, or credential expiry, may remove a node from a floating network.

In at least one of the various embodiments, the underlying physical network used by a host may remain intact and/or unaffected by the activation of a node or removal of a node from the floating network. However, some applications and/or services resident on a host that is no longer a node in the floating network may be disabled from participating in the floating network.

Furthermore, in at least one of the various embodiments, a host computer may host more than one node of the same or different floating network. Also, nodes having different ancestors may be resident on the same host computer. For example, referring to FIG. 6, node 620 and node 608 may be resident on the same host computer even though node 604 and node 606 may be resident on different host computers.

Figure 7:
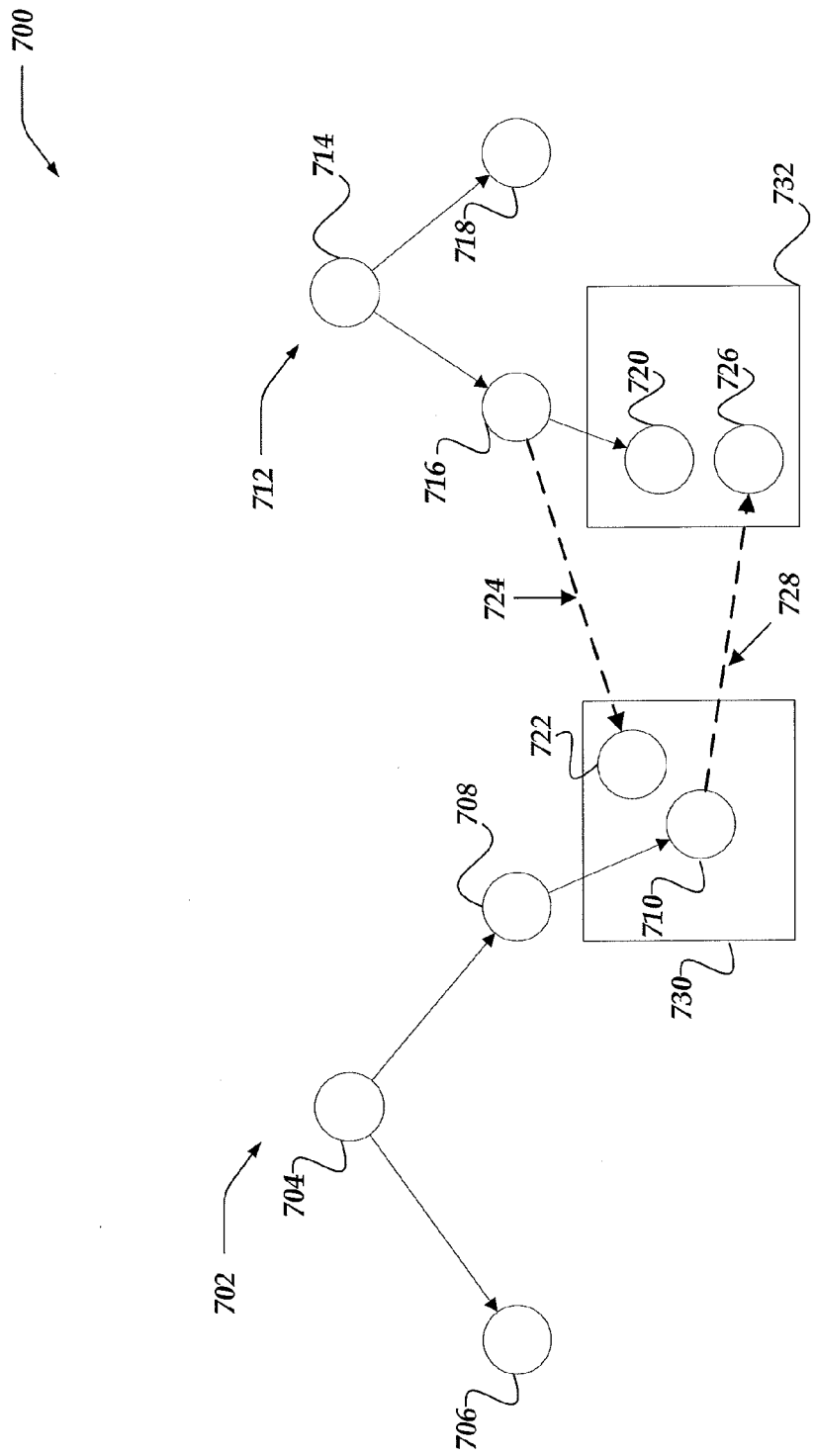
FIG. 7 shows an overview of a cross-organizational floating network system in accordance with at least one of the various embodiments.

FIG. 7 shows an overview of multi-floating networks system 700 in accordance with at least one of the various embodiments. In at least one of the various embodiments, separate organizations may want to establish cross-organization floating network that enables some portions of each floating network to share resources and/or hosts with the other. A cross-organizational floating network may include nodes that are simultaneously operative on the same host enabling the host computers resources to be visible to one or more floating networks.

For example, in at least one of the various embodiments, separate floating networks, such as, floating network 702 and floating network 712 may include nodes hosted on computers that may be operative on physically separate networks, such as on data centers located in different regions of a country. Also, in at least one of the various embodiments, separate floating networks may be located on the same physical networks where the floating networks may be arranged to be logically and functionally separate from each other.

In the example illustrated in FIG. 7, node 704 represents the root node of floating network 702 and node 714 represents the root node of floating network 712. Accordingly, node 706, node 708 and node 710, in this example, are part of floating network 702. Likewise, node 716, node 718, and node 720 are part of floating network 712. Host 730 and host 732 represent host computers where nodes may be resident. Note, even though all of the nodes in this figure are resident on host computers, for brevity, only host 730 and host 732 are shown in this figure.

Accordingly, for the purposes of this example, if edge 724 and edge 728 and node 726 and node 726 are disregarded for now, there is no sharing of resources between floating network 702 and floating network 712. However, in at least one of the various embodiments, to enable cross-organizational resource sharing using multiple floating networks, agent installers may be arranged to install agents on one or more hosts that may simultaneously include nodes of a separate floating network. These agents, depending on their configuration, may enable nodes from one floating network to be co-resident on the same host as other nodes from another floating network. Thus, in at least one of the various embodiments, resources of hosts having co-resident nodes may be shared between the floating networks.

In at least one of the various embodiments, installing an agent from one floating network onto a host where a node of another floating network resides may enable the different floating networks to share the same host. For example, if an agent installer that includes credential information from node 716 is arranged for installing an agent on host 730, the host where node 710 resides, a new node, such as node 722 may be enabled to join floating network 712 even though it is resident on a host that includes a node associated with floating network 702. In this example, the cross-organizational trust relationship enabling node 722 to join floating network 712 is indicated by edge 724. Likewise, for example, if an agent installer that includes credential information from node 710 is used to install an agent on host 732 where node 720 is resident, a new node, such as node 726 may be enabled to join floating network 702, as indicted by edge 728.

Accordingly, in at least one of the various embodiments, installing an agent on a host using an agent installer from a floating network enables resources from that host to be made available to the floating network. Thus, in at least one of the various embodiments, a host with one or more co-resident nodes from different floating networks may be enable to share resources with each of the different floating networks.

In at least one of the various embodiments, if a node from one floating network is resident on the same host as a node from another floating network, both floating networks may be enabled share the resources of the host. For example, node 716 may have a trust relationship with node 722 exclusive of the nodes in floating network 702 that enable resources on host 730 to be made available to floating network 712. Likewise, node 726, installed on host 732 may enable floating network 702 to access the resources on host 732. Thus, in this example, host 730 and host 732 may each have two agents operative at the same time—one for floating network 702 and one for floating network 712.

Accordingly, in this example, floating network 712 may establish and enforce network policies and rules that define how node 722 interacts with other nodes in floating network 712. Likewise, in this example, floating network 702 may establish and enforce network policies and rules that define how node 726 interacts with other nodes in floating network 702.

Figure 8:
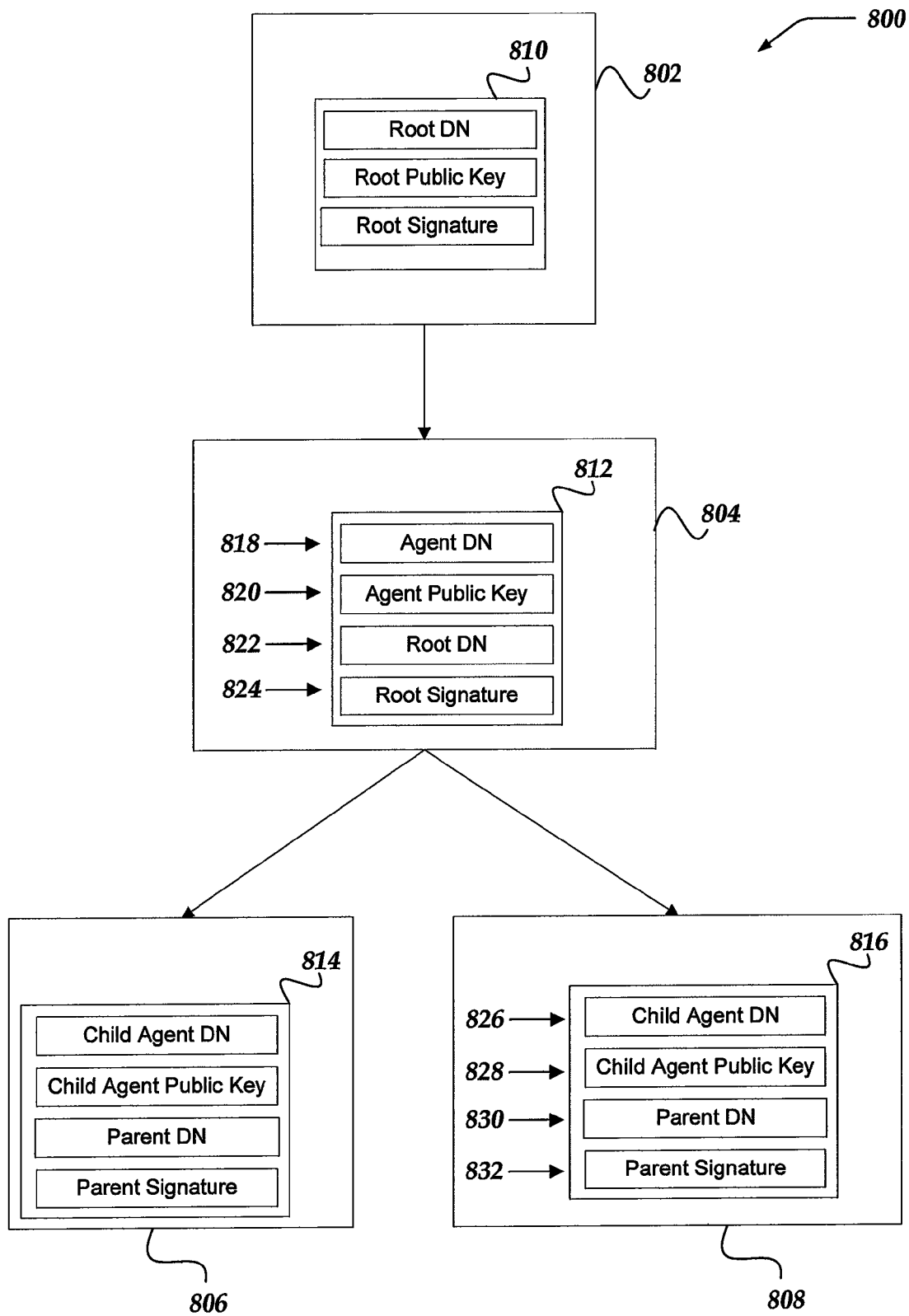
FIG. 8 shows an overview of hierarchal trust relationships for a floating network in accordance with at least one of the various embodiments.

FIG. 8 shows an overview of hierarchal trust relationships for floating network 800 in accordance with at least one of the various embodiments. As discussed above various methods may be employed for establishing and/or maintaining hierarchal trust relationships for nodes in a floating network. At least one of the various embodiments may use cryptographic certificates. FIG. 8 shows for at least one embodiment how cryptographic certificates may be arranged for authenticating and/or identifying nodes in a floating network.

FIG. 8 represents a floating network embodiment that generates credential information using cryptographic certificates with public key infrastructure (PKI). This credential information may be employed for establishing trust relationships among nodes in accordance with at least one of the various embodiments. Even though well-known elements of cryptographic certificate and public key infrastructure may be described, the innovations herein are not so limited. In some embodiments, other PKI and cryptographic certificate methods may be employed for generating credentials without departing from the scope these innovations. The description of PKI and cryptographic certificates included below is a non-limiting example provided to clarify how embodiments of the innovations claimed herein may be implemented. One of ordinary skill in the art will appreciate that other variations for generating and validating credentials may be employed without departing from the scope of these innovations.

In at least one of the various embodiments, nodes 802-808 in floating network 800 may be associated with credentials that include a unique cryptographic certificate. In this example, node 802 may be associated with certificate 810, node 804 may be associated with certificate 812, node 806 may be associated with certificate 814, and node 808 may be associated with certificate 816. Each cryptographic certificate may be employed by agents and/or floating network management server computers for authenticating the identity of the nodes in the floating network and/or establishing trust relationships within the floating network.

For this example, in at least one of the various embodiments, node 802 may be a root node of floating network 800, accordingly certificate 810 may be considered a root certificate for floating network 800. The basic components of the root certificate for floating network 800 may include a Distinguished Name (DN) for expressing human readable and/or string name associated with the certificate, a public key associated with the certificate, and a root signature generated using the private key (not shown) of the certificate. Accordingly, agent installers generated for node 802 may include credential information that includes some or all of root certificate 810.

In at least one of the various embodiments, the next node in floating network 800, node 804, may include certificate 812. The agent operative on node 804 may be arranged to provide certificate 812 for authentication and/or identification. Certificate 812 may include information such as, Agent DN 818, Agent Public Key 820, Root DN 822, and Root Signature 824. Certificate 812 includes credential information that is associated with its parent certificate, in this case, certificate 810, from root node 802.

In at least one of the various embodiments, in this example, for floating network 800, the agent for node 804 was installed using an agent installer that may have been arranged to include credential information associated with its parent node, node 802. In at least one of the various embodiments, the parent credential information (based on certificate 810) may be employed to generate the child certificate, certificate 812.

Node 806 and node 808, in this example, are both child nodes of parent node 804. Accordingly, they each include certificates, certificate 814 and certificate 816, respectively, that may be used as credentials for authenticating with floating network 800. Since, in this example, node 806 and node 808 are descendents from node 804, their certificates (e.g., certificate 814 and certificate 816) have been generated based on the certificate corresponding to node 804 (e.g., certificate 812). Accordingly, certificate 814 and certificate 816 include credential information related to their ancestor, certificate 812. Thus, certificate 814 and certificate 816 are child credentials descending from parent credentials based on certificate 812 For example, in at least one of the various embodiments, certificate 816 includes Child Agent DN 826, Child Agent Public Key 828, Parent DN 830, and Parent Signature 832. For this example, certificate 816 includes fields and properties consistent with one or more cryptographic certificate standards.

In at least one of the various embodiments, Child Agent DN 826 may be a human readable/recognizable string that includes a name of the agent used to enable the to join the floating network. The actual name may be generated automatically by the agent installer that generates that credential information for the agent. One or more policy rules and/or configuration settings may be employed to determine one or more of the characteristics of the name. For example, the child agent DN may be configured to automatically use name prefixes (e.g., db-, www-, mail-, or the like), incremented index values (e.g., db-001, db-002, or the like), and so on.

In at least one of the various embodiments, Child Agent Public Key 828 may be a cryptographic public key compatible with one or more public key infrastructures (PKI) that corresponds to the certificate.

In at least one of the various embodiments, to indicate that the child agent comes from, or may be in a trust relationship with a particular parent agent, certificate 816 may include Parent DN 803 that will include the DN of the parent. In this example, Parent DN 830 will be set to include the value of Agent DN 818. Likewise, certificate 832 may include cryptographic signature corresponding to the parent agent's certificate. For example, information included in Parent Signature 832 corresponds to certificate 812. In at least one of the various embodiments, agents, agent installers, and/or floating network management servers, may be arranged to employ one or more cryptographic techniques, to verify that the cryptographic signature information included in Parent Signature 832 corresponds to certificate 812. For example, public key information may be retrieved from certificate 812 (e.g., Agent Public Key 820) and employed to decrypt the parent's signature information included in certificate 816 where a successful decryption provides substantial indication that certificate 816 is related to certificate 804. Accordingly, if the child agent is authenticated, node 808 may be enabled to join floating network 800.

Generalized Operation

The operation of certain aspects of the invention will now be described with respect to FIGS. 9-12. In at least one of various embodiments, processes 900, 1000, 1100, and 1200 described in conjunction with FIGS. 9-12, respectively, may be implemented by and/or executed on a network computer, such as network computer 300 of FIG. 3. In other embodiments, these processes or portions of these processes may be implemented by and/or executed on a plurality of network computers, such as network computer 300 of FIG. 3. Further, in other embodiments, these processes or portions of these processes may be implemented by and/or executed on one or more client computers, such as client computer 200 as shown in FIG. 2. Also, in at least one of the various embodiments, these processes or portions of these processes may be implemented by and/or executed on one or more cloud instances operating in one or more cloud networks. However, embodiments are not so limited and various combinations of network computers, or the like, may be utilized.

Figure 9:
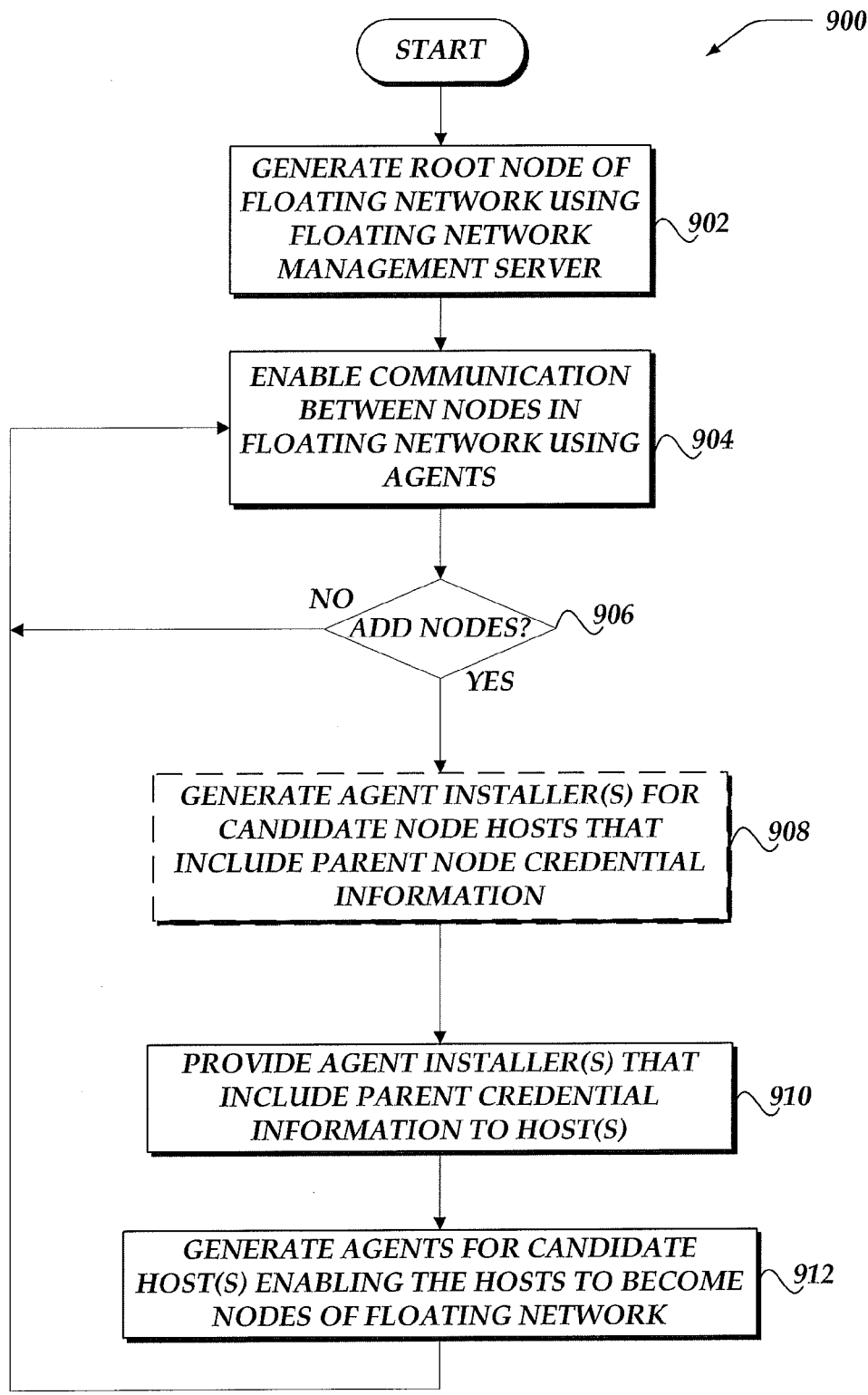
FIG. 9 shows an overview flowchart for a process for cloud scale automatic identity management in accordance with at least one of the various embodiments.

FIG. 9 shows an overview flowchart for process 900 for cloud scale automatic identity management in accordance with at least one of the various embodiments. After a start block, at block 902, in at least one of the various embodiments, a root node for a floating network may be generated using a floating network management application, such as, floating network management application 321. In at least one of the various embodiments, as discussed above, the root node may be resident on a host that includes an agent that may include credentials for identifying the node. In at least one of the various embodiments, the root node may be provided as an aspect or feature of a floating network management application, rather than a host.

At block 904, in at least one of the various embodiments, communication, such as, network traffic, between and among nodes in the floating networks may be managed by an application such as, floating network management application 321. Initially, there may be just the root node but as nodes are added to the floating network, communication and/or network traffic between nodes may be enabled by their respective agents resident on their hosts.

At decision block 906, in at least one of the various embodiments, if nodes may be added to the floating network, control may flow to block 908; otherwise, control may flow back to block 904.

In at least one of the various embodiments, nodes may be added to a floating network for various reasons. In some embodiments, if the floating network includes cloud instances, the cloud network may be configured to automatically provision additional cloud instances if one or more performance thresholds are met or exceeded. Or, in at least one of the various embodiments, cloud networks may be configured to automatically provision additional cloud instances based on a pre-configured schedule. Nevertheless, since the new cloud instances may be arranged to host nodes that will become part of the floating network, each cloud instance may represent a host that may become a node added to an existing floating network.

In at least one of the various embodiments, a new node may be required if a user wants to joins his or her mobile computer or desktop to the floating network. Likewise, in at least one of the various embodiments, nodes may be added if other computers are to be enabled to participate in the floating network whether manually or automatically.

In at least one of the various embodiments, hosts that may be candidates for installing agents for generating nodes on the floating network may be determined automatically. For example, they may be one or more cloud instances that are provisioned automatically, or they may be computers for a user that wants to enable their computer to participate a floating network.

In at least one of the various embodiments, new nodes added to a floating network may be child nodes of another node in the floating network. Accordingly, in at least one of the various embodiments, each node in a floating network, except for the root node, may descend from a parent node.

At block 908, in at least one of the various embodiments, optionally, agent installers for the hosts of the candidate nodes may be generated. In at least one of the various embodiments, the generated agent installers may be arranged to include credential information (parent credential information) from the parent node for the new child nodes being added to the floating network. In some cases, the agent installers may have been previously generated, thus this step may be optional. However, in at least one of the various embodiments, agent installers that include the parent credential information may be generated before the candidate nodes and/or new hosts are determined or at the time the candidate nodes and/or the hosts are determined for adding to the floating network. Note, at this point in the process, the "new" child nodes may be considered candidate nodes since they have not been authenticated and joined with the floating network.

At block 910, in at least one of the various embodiments, agent installers (at least one agent installer for each candidate child node) may be provided to the one or more determined host computers that correspond to the candidate child nodes. In at least one of the various embodiments, the agent installers may include parent credential information, such as, cryptographic certificate information that may be used for generating cryptographic certificates for authenticating the candidate nodes with the floating network.

In at least one of the various embodiments, user may be enabled to download a particular agent installer that may enable their computer to join a floating network. For example, a user may be enabled to access a secure website using a public network and download the agent installer. In other cases, user may receive an email that includes secure link to the agent installer for downloading. Likewise, the agent installer may be sent to one or more authorized users as an email attachment.

In at least one of the various embodiments, if the host is a cloud instance, the agent installer may be previously installed as part of the software image that is used for provisioning the cloud instance. Likewise, the agent installers may be pre-installed on images for other virtual machines as well. Accordingly, when the cloud instance or virtual machine boots up, or is otherwise activated, the agent installer may execute.

Further, in at least one of the various embodiments, the agent installers may be copied to a memory card or other portable memory for later installation on a host computer.

At block 912, in at least one of the various embodiments, the agent installers may generate agents for the candidate nodes. In at least one of the various embodiments, the agents may be considered child agents of parent agents that may be on the parent nodes. Subsequently, the agents may attempt to authenticate with the floating network enabling the candidate node to join the floating network. Next, in at least one of the various embodiments, control may be returned to a calling process.

In at least one of the various embodiments, the process of adding nodes to a floating network may be described in term of parent and child relationships of the nodes, agents, or credentials. If nodes are to be added to a floating network, a parent node in a floating network may be determined. The parent node includes at least one parent agent operating on its host and that agent, the parent agent may includes parent credentials that may be used for authenticating the parent node and/or agent.

In at least one of the various embodiments, before adding new nodes to the floating network, one or more hosts may be determined. Next, an agent installer that includes at least a portion of the parent credentials may be provided to each host. Next, the provided agent installer may be executed to generate child agents for the hosts and child credentials for each host. Accordingly, in at least one of the various embodiments, the child credentials included in child agents may be based on at least a portion of the parent credentials. In some embodiments, the parent credentials may include cryptographic certificate used to generate a cryptographic certificate that may be employed as part of the child credentials. The child agent and child credentials may be authenticated enabling a child node for the floating network to become resident on the host.

In at least one of the various embodiments, the credential information may be omitted from the agent installer. In at least one of the various embodiments, a hardware security module (HSM), such as, HSM 252 or HSM 340, may be employed to generate credentials. Accordingly, in at least one of the various embodiments, the HSM may contain or be loaded with the relevant parent credentials for generating the child credentials onboard the HSM. After, the child credentials are created they may be provided to the host where the child resides.

In at least one of the various embodiments, even though a child node in the floating network may be a direct descendent of its parent node, the host where a child node is resident and the host where a parent node is resident may be arranged differently. There is no requirement that the hosts themselves maintain a child-parent relationship. For example, the host for a child node may be on a different physical network than the host for its parent. Accordingly, the child-parent relationship between nodes may be a function of the child agent and parent agent and their respective credentials rather than the organization of the hosts.

Figure 10:
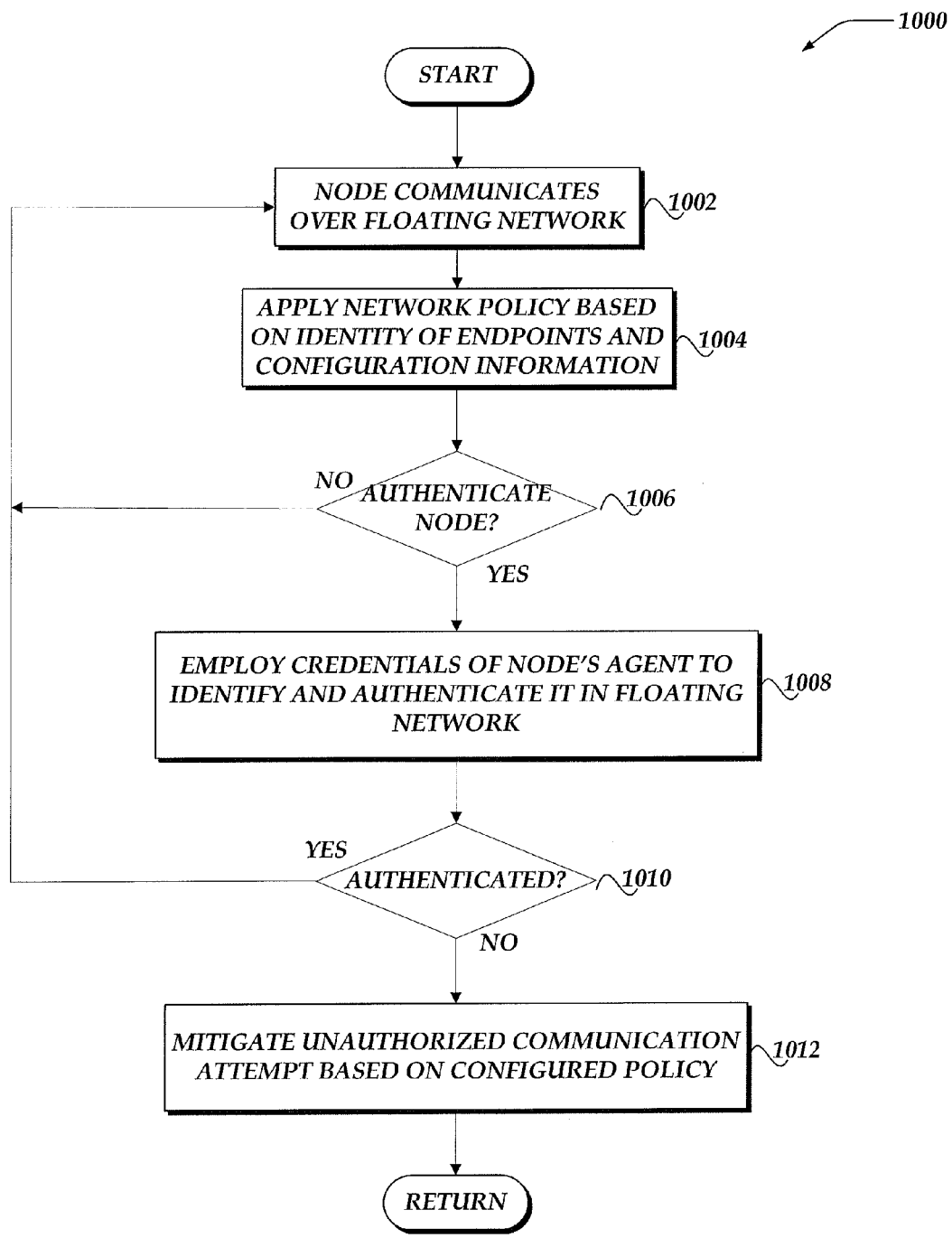
FIG. 10 shows a flowchart for a process for communicating and managing network traffic over a floating network, in accordance with at least one of the various embodiments.

FIG. 10, shows a flowchart for process 1000 for communicating and managing network traffic over a floating network, in accordance with at least one of the various embodiments. After a start block, at block 1002, one or more nodes may be communication over a floating network. In at least one of the various embodiments, communication may include network traffic originating from an endpoint that is outside of the floating network or from a node that is within the floating network.

For example, if a node is arranged to be a web server it may receive network traffic that originates from outside the floating network. In contrast, in some embodiments, a node that is part floating network arranged to be a private network may just receive network traffic from other nodes in the floating network.

At block 1004, in at least one of the various embodiments, network traffic policies based on the unambiguous identity of nodes, and/or other endpoints may be applied to network communication on the floating network.

At decision block 1006, in at least one of the various embodiments, if a node requires authentication, control may flow to block 1008; otherwise, control may loop back to block 1002.

In at least one of the various embodiments, configuration information and/or one or more policy instructions may be employed to enforce if and/or when a node authenticates itself with a floating network. In at least one of the various embodiments, configurations and policy may vary by node and/or floating network portions. For example, referring to FIG. 6, a policy may require all nodes descending from node 610 to authenticate more often than nodes descending from node 608. The determination of a particular authentication policy may be based on the type of communication expected, security requirements, performance considerations, or the like.

In at least one of the various embodiments, a given node may be determined to require authorization and/or identification depending on the characteristics of the node and/or the characteristics of the network traffic that comprises the communication. For example, if the node is attempting to join the floating network for the first time it may be required to be authenticated within the context of the floating network.

Likewise, in at least one of the various embodiments, the floating network management server may apply policies that require nodes to authenticate themselves if a timeout expires, or the like. For example, in at least one of the various embodiments, cryptographic certificates used as credentials may be generated to include an expiration time that limits the length of time the certificate will be trusted.

In at least one of the various embodiments, a change in behavior of a node may require it to authenticate itself with the network. For example, if a previously unseen network application is determined to be sending traffic over the node, then the node may be designated for authentication.

Also, in at least one of the various embodiments, a change in the characteristics of the host where the node is resident may trigger a reauthorization of a node. For example, the floating network may be configured to authenticate a node each time the MAC address associated with its host changes. Still further, the floating network may be configured to authenticate a node each time a new network application session, or network flow is detected.

Accordingly, the network policy for the network traffic communicated over the floating network may depend on identity of the node. For example, if the node is a web server node (e.g., it is hosting one or more web server applications) it may be configured to accept HTTP network traffic and reject/ignore email traffic.

Also, in at least one of the various embodiments, other configuration policies may trigger the requirement for a node to identify itself, such as, expiration of timeouts, traffic quotas being exceeded, first time traffic for an application has been observed, license enforcement, or the like.

Note, that even if the host computer and/or cloud instance is previously authenticated within another networking context (e.g., a physical network or a cloud network) the node must be authenticated separately within the context of the floating network.

At block 1008, in at least one of the various embodiments, the credentials included in the node's agent may be employed to identify and/or authenticate the node for the floating network. In at least one of the various embodiments, since the nodes credential information may be chained to their ancestor nodes, the path from the node to the root node may be determined by traversing the nodes of the floating network from the node of interest to the root node. This path may be used to construct an identifier that unambiguously identifies the node within the floating network.

At decision block 1010, in at least one of the various embodiments, if the node is successfully identified and/or authenticated, control may loop back to block 1002; otherwise, control may flow to block 1012.

At block 1012, in at least one of the various embodiments, the unauthorized communication attempt by the unidentified endpoints may be mitigated based on configured policy. For example, in at least one of the various embodiments, unauthorized communication attempts may be recorded in a log file for subsequent review. In some cases, users (e.g., administrators) may be notified of the failed identification of the endpoint. Generally, the floating network management server may be arranged to enable customizable mitigation of unauthorized communication. If communication traffic on the floating network may be occurring, control may loop to block 1002 for continued processing; otherwise, control may be returned to a calling process.

Figure 11:
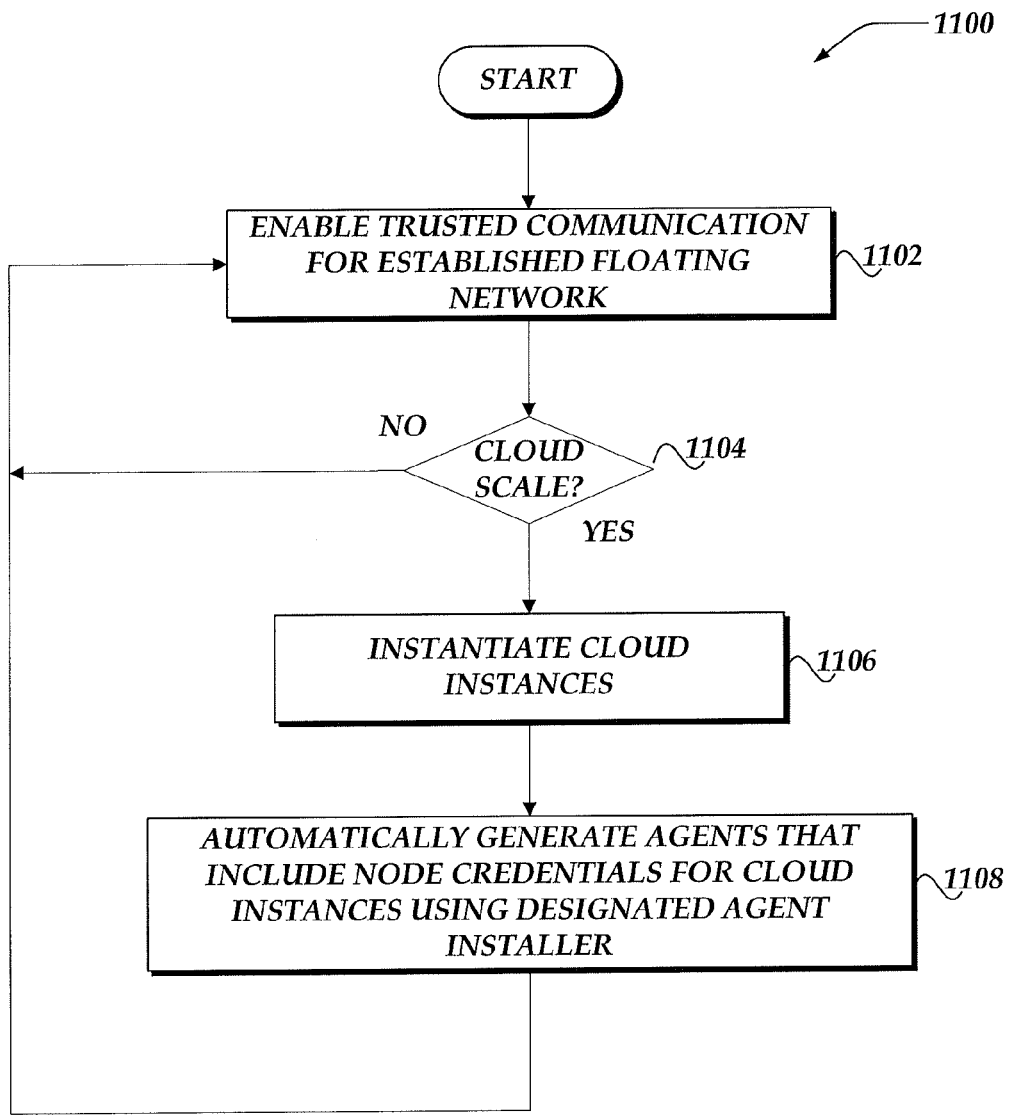
FIG. 11 shows a flowchart for a process for cloud scaling in accordance with at least one of the various embodiments.

FIG. 11, shows a flowchart for process 1100 for cloud scaling in accordance with at least one of the various embodiments. After a start block, at block 1102, communication may be enabled for one or more established floating networks.

At decision block 1104, in at least one of the various embodiments, if cloud scaling is initiated, control may flow to block 1106; otherwise, control may loop back to block 1102.

In some embodiments, if the floating network includes nodes resident on cloud instances, the cloud network may be configured to automatically provision additional cloud instances that are intended to host nodes for the floating network. In at least one of the various embodiments, cloud network may configured to automatically provision cloud instances if one or more performance thresholds are met or exceeded. Or, in at least one of the various embodiments, cloud networks may be configured to automatically provision additional cloud instances based on a pre-configured schedule. In at least one of the various embodiments, each provisioned cloud instance may be considered a candidate host for a node of an existing floating network.

At block 1106, in at least one of the various embodiments, one or more cloud instances may be instantiated in one or more cloud networks. In response to configuration directives or operational considerations (e.g., CPU utilization exceeding a threshold), the cloud network may determine one or more new cloud instances to initialize on behalf of an application or service.

At block 1108, in at least one of the various embodiments, agents that include credentials for the cloud instances may be generated using one or more designated agent installers. As each cloud instance host boots up or otherwise activates, an agent installer that may be pre-installed in the image used for the cloud instance may execute. Upon execution, the agent installer may generate credentials that may be included in the agent for the cloud instance. In at least one of the various embodiments, the agent installer may include credential information that corresponds to the parent node for generating the credentials for the new nodes that may reside on each cloud instance. As discussed above, the agent installer may use the parent credential information to generate credentials for the new node. If the new node credential information is generated, the parent credential information that was included with the agent installer may be removed, deleted, or otherwise destroyed from the cloud instance. In at least one of the various embodiments, the agent installer may be arranged to employ a hardware security module for generating the credentials for authenticating the nodes.

For example, in at least one of the various embodiments, an image used for instantiating a cloud instance may include a startup script that launches an agent installer program that is included as part of the image. Next, in at least one of the various embodiments, control may loop back to block 1102.

Figure 12:
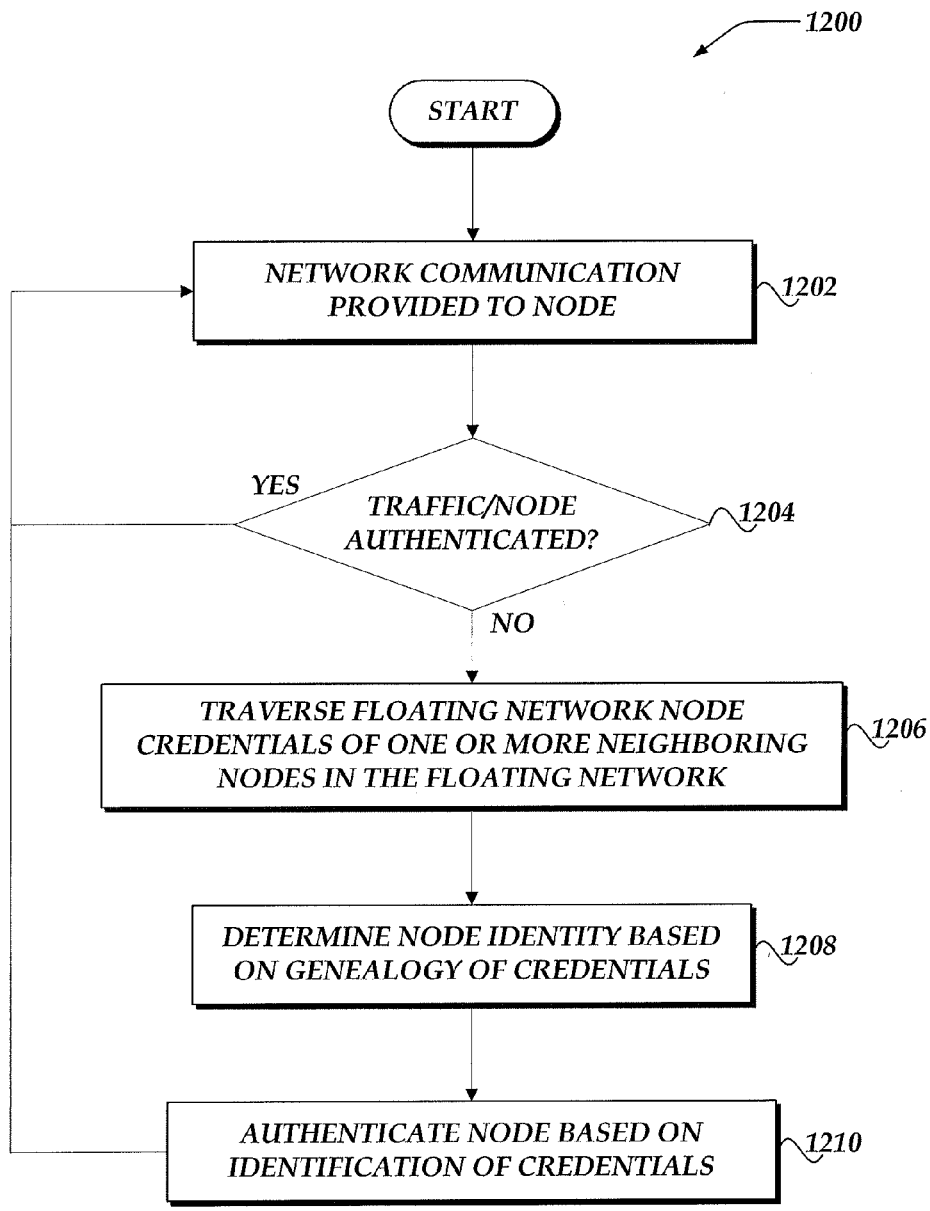
FIG. 12 shows a flowchart for a process for unambiguously identifying a node in a floating network in accordance with at least one of the various embodiments.

FIG. 12, shows a flowchart for process 1200 for identifying a node that may be operative on in a floating network in accordance with at least one of the various embodiments. After a start block, at block 1202, network communications may be provided to a node in a floating network. In at least one of the various embodiments, network communications may include network traffic from another node in the floating network or a source from outside the floating network.

At decision block 1204, in at least one of the various embodiments, if the node requires authentication or identification, control may loop back to block 1202; otherwise, control may flow to block 1206. (See, the description for block 1006 regarding embodiments for determining if a node requires authentication.)

At block 1206, in at least one of the various embodiments, the floating network may be traversed to determine the nodes that may intervene between the node being identified and a terminating node in the floating network. In at least one of the various embodiments, the terminating node may be the root node for the floating network. In at least one of the various embodiments, determining the identity of a floating network node is based on evaluating the trust relationship of the node within the context of the floating network. The node may include credential information that was generated based on credential information from a parent node in the floating network. As discussed above, in at least one of the various embodiments, the credentials may be arranged for tracing to the parent node for any child node. See, FIG. 8 and accompanying description.

Accordingly, in at least one of the various embodiments, starting with the node being evaluated, the credentials in each related node may be determined and traced through the floating network until a terminating node is reached. If each step in the credential chain does not lead to a trusted ancestor, the identity of the node being evaluated may be considered suspect. In at least one of the various embodiments, determining the number of nodes to traverse, and/or determining a terminating node may be based on one or more policies, configurations, rules, or the like. Likewise, in at least one of the various embodiments, determining whether to traverse the line of descent to the root node may be based one or more policies, configurations, rules, or the like.

In at least one of the various embodiments, the nodes intervening between the terminating node and the node under evaluation may be considered intermediate authorities that contribute to determining trust relationships within the floating network.

At block 1208, in at least one of the various embodiments, the identity and/or trustworthiness of the node may be determined based on the genealogy of the node's credentials. In at least one of the various embodiments, if the credentials of the evaluated node may be traced, and a relevant and/or trustworthy genealogy is matched, the particular path of within the floating network as traced to the terminating node may be employed as an identifier for the node that was evaluated. In at least one of the various embodiments, if the path may be traced to the root node of the floating network, the resulting genealogy may be employed to unambiguously identify the node of interest.

For example, in at least one of the various embodiments, referring back to FIG. 6, node 620 may be uniquely identified using the path node 620 to node 612 to node 606 to node 602. Likewise, node 624 may be uniquely identified using the path node 624 to node 614 to node 606 to node 602. The unique path determined by tracing the credentials included in each node may be employed as unique identifier within the floating network.

In another example, in at least one of the various embodiments, also referring back to FIG. 6, a genealogy pattern may be defined, such that nodes having a genealogy that includes the path from node 614 to node 606 may be attributed a defined level of trustworthiness and/or be characterized based on the matching the path rather than requiring a match all the way back to root node 602.

In at least one of the various embodiments, the path determined by traversing the ancestor nodes related to a node may be represented in various ways. For example, unique portions of each credential in the chain from the node to the root node may be hashed into a value and stored into table or list and used to identify the node within the floating network.

In at least one of the various embodiments, the level of trustworthiness attributable to a genealogy pattern may be determined based on one or more defined policies, configurations, or the like, associated with the pattern. Further, in at least one of the various embodiments, genealogy patterns may be employed to map and/or associate other characteristics to a node for policy, management, and/or reporting purposes. For example, a genealogy pattern, such as, the path from node 606 to node 614 may be defined to represent database servers. Accordingly, in this example, one of more policies for managing database servers may be applied to each node that includes the defined genealogy pattern. Thus, completing this example, node 622 and node 624 would match and be identified as database servers.

At block 1210, in at least one of the various embodiments, the node may be authenticated based on the identification of the node and/or the genealogy of the node's credentials. In at least one of the various embodiments, if an identity for the node may be determined, the identity may be employed to authenticate the node with the floating network. Next, control may loop back to block 1202.

Note, in at least one of the various embodiments, even though a credential evaluation may otherwise succeed, an authentication may fail for a variety of secondary reasons, such as, expired credentials (at the node or at intervening nodes), policy considerations (authorization rights may be restricted to apply in limited circumstances), exceeding a delay threshold when traversing the floating network, or the like. For example, in at least one of the various embodiments, configuration policy may restrict a user to only having one authorized node at time. Or, for example, a user may be restricted from authorizing a home-based computer during normal working hours, or the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing examples should not be construed as limiting and/or exhaustive, but rather, an illustrative use case to show an implementation of at least one of the various embodiments of the invention.

What is claimed as new and desired to be protected by Letters Patent of the United States is:

1. A method for managing resources for a plurality of computers, comprising:
   determining a parent node in a floating network, wherein the parent node includes at least one parent agent that includes at least parent credentials;
   determining at least one host for adding to the floating network;
   providing an agent installer to the at least one host, wherein the agent installer includes at least a portion of the parent credentials;
   employing the provided agent installer to generate at least one child agent for the at least one host and child credentials, wherein the at least one child agent includes the child credentials that are based at least in part on the at least portion of the parent credentials;
   employing the child agent to generate a child node for the floating network that is resident on the at least one host;
   determining an unambiguous identity value that corresponds to the child node based in part on tracing a trust relationship path from the child node to the parent node and to a root node of the floating network, wherein other nodes in the floating network that intervene between the parent node and the root node contribute information to the unambiguous identity value; and
   applying at least one policy for the floating network to the child node based at least in part on the unambiguous identity value.

2. The method of claim 1, wherein generating the child agent further comprises, deleting the at least portion of the parent credentials from the host after the child credentials are generated.

3. The method of claim 1, further comprising:
   installing the agent installer on an image used for at least one cloud instance; and
   executing the agent installer on the at least one cloud instance when the at least one cloud instance is instantiated, wherein the at least one child agent is installed on the at least one cloud instance.

4. The method of claim 1, wherein the generated child credentials are unique for each child node.

5. The method of claim 1, further comprising:
   providing another agent installer associated with another floating network to the at least one host;
   generating at least one other child agent for the at least one host; and
   employing the least one other child agent to generate another child node for the other floating network on the at least one host while at the same time the child node for the floating network remains operative on the at least one host.

6. The method of claim 1, further comprising, enabling a user to download the agent installer onto a client computer, wherein the agent installer is employed to generate another child agent that enables the client computer to become another child node on the floating network.

7. The method of claim 1, further comprising, authenticating the child node based on a genealogy of the child credentials included in the child agent, the parent credentials, and credentials for each other agent between the parent node and a terminating node.

8. The method of claim 1, further comprising, generating the child credentials using a hardware security module and providing them to the at least one host.

9. A network computer for managing resources for a plurality of computers, comprising:
   a transceiver for communicating over a network;
   a memory for storing at least instructions;
   a processor device that is operative to execute instructions that enable operations, including:
     determining a parent node in a floating network, wherein the parent node includes at least one parent agent that includes at least parent credentials;
     determining at least one host for adding to the floating network;
     providing an agent installer to the at least one host, wherein the agent installer includes at least a portion of the parent credentials;
     employing the provided agent installer to generate at least one child agent for the at least one host and child credentials, wherein the at least one child agent includes the child credentials that are based at least in part on the at least portion of the parent credentials;

employing the child agent to generate a child node for the floating network that is resident on the at least one host;

determining an unambiguous identity value that corresponds to the child node based in part on tracing a trust relationship path from the child node to the parent node and to a root node of the floating network, wherein other nodes in the floating network that intervene between the parent node and the root node contribute information to the unambiguous identity value; and applying at least one policy for the floating network to the child node based at least in part on the unambiguous identity value.

10. The network computer of claim 9, wherein generating the child agent further comprises, deleting the at least portion of the parent credentials from the host after the child credentials are generated.

11. The network computer of claim 9, further comprising:
installing the agent installer on an image used for at least one cloud instance; and
executing the agent installer on the at least one cloud instance when the at least one cloud instance is instantiated, wherein the at least one child agent is installed on the at least one cloud instance.

12. The network computer of claim 9, wherein the generated child credentials are unique for each child node.

13. The network computer of claim 9, further comprising:
providing another agent installer associated with another floating network to the at least one host;
generating at least one other child agent for the at least one host; and
employing the least one other child agent to generate another child node for the other floating network on the at least one host while at the same time the child node for the floating network remains operative on the at least one host.

14. The network computer of claim 9, further comprising, enabling a user to download the agent installer onto a client computer, wherein the agent installer is employed to generate another child agent that enables the client computer to become another child node on the floating network.

15. The network computer of claim 9, further comprising, authenticating the child node based on a genealogy of the child credentials included in the child agent, the parent credentials, and credentials for each other agent between the parent node and a terminating node.

16. The network computer of claim 9, further comprising, generating the child credentials using a hardware security module and providing them to the at least one host.

17. A processor readable non-transitive storage media that includes instructions for managing resources for a plurality of computers, wherein a network device that executes at least a portion of the instructions enables operations, comprising:
determining a parent node in a floating network, wherein the parent node includes at least one parent agent that includes at least parent credentials;
determining at least one host for adding to the floating network;
providing an agent installer to the at least one host, wherein the agent installer includes at least a portion of the parent credentials;
employing the provided agent installer to generate at least one child agent for the at least one host and child credentials, wherein the at least one child agent includes the child credentials that are based at least in part on the at least portion of the parent credentials;

employing the child agent to generate a child node for the floating network that is resident on the at least one host;

determining an unambiguous identity value that corresponds to the child node based in part on tracing a trust relationship path from the child node to the parent node and to a root node of the floating network, wherein other nodes in the floating network that intervene between the parent node and the root node contribute information to the unambiguous identity value; and applying at least one policy for the floating network to the child node based at least in part on the unambiguous identity value.

18. The media of claim 17, wherein generating the child agent further comprises, deleting the at least portion of the parent credentials from the host after the child credentials are generated.

19. The media of claim 17, further comprising:
installing the agent installer on an image used for at least one cloud instance; and
executing the agent installer on the at least one cloud instance when the at least one cloud instance is instantiated, wherein the at least one child agent is installed on the at least one cloud instance.

20. The media of claim 17, wherein the generated child credentials are unique for each child node.

21. The media of claim 17, further comprising:
providing another agent installer associated with another floating network to the at least one host;
generating at least one other child agent for the at least one host; and
employing the least one other child agent to generate another child node for the other floating network on the at least one host while at the same time the child node on the floating network remains operative on the at least one host.

22. The media of claim 17, further comprising, enabling a user to download the agent installer onto a client computer, wherein the agent installer is employed to generate another child agent that enables the client computer to become another child node on the floating network.

23. The media of claim 17, further comprising, authenticating the child node based on a genealogy of the child credentials included in the child agent, the parent credentials, and credentials for each other agent between the parent node and the a terminating node.

24. A system arranged for managing resources for a plurality of computers, comprising:
a server computer, including:
a transceiver for communicating over a network;
a memory for storing at least instructions;
a processor device that is operative to execute instructions that enable operations, including:
determining a parent node in a floating network, wherein the parent node includes at least one parent agent that includes at least parent credentials;
determining at least one host for adding to the floating network;
providing an agent installer to the at least one host, wherein the agent installer includes at least a portion of the parent credentials;
employing the provided agent installer to generate at least one child agent for the at least one host and child credentials, wherein the at least one child agent includes the child credentials that are based at least in part on the at least portion of the parent credentials;

employing the child agent to generate a child node for the floating network that is resident on the at least one host;

determining an unambiguous identity value that corresponds to the child node based in part on tracing a trust relationship path from the child node to the parent node and to a root node of the floating network, wherein other nodes in the floating network that intervene between the parent node and the root node contribute information to the unambiguous identity value; and applying at least one policy for the floating network to the child node based at least in part on the unambiguous identity value; and a client computer, comprising:
a transceiver that is operative to communicate over the network;
a memory that is operative to store at least instructions; and
a processor device that is operative to execute instructions that enable operations, including:
hosting at least the child node in the floating network.

25. The system of claim 24, wherein generating the child agent further comprises, deleting the at least portion of the parent credentials from the host after the child credentials are generated.

26. The system of claim 24, further comprising:
installing the agent installer on an image used for at least one cloud instance; and
executing the agent installer on the at least one cloud instance when the at least one cloud instance is instantiated, wherein the at least one child agent is installed on the at least one cloud instance.

27. The system of claim 24, wherein the generated child credentials are unique for each child node.

28. The system of claim 24, further comprising:
providing another agent installer associated with another floating network to the at least one host;
generating at least one other child agent for the at least one host; and
employing the least one other child agent to at least enable the at least one host to become another child node on the other floating network while at the same time being the child node on the floating network.

29. The system of claim 24, further comprising, enabling a user to download the agent installer onto a client computer, wherein the agent installer is employed to generate another child agent that enables the client computer to become another child node on the floating network.

30. The system of claim 24, further comprising, authenticating the child node based on a genealogy of the child credentials included in the child agent, the parent credentials, and credentials for each other agent between the parent node and a terminating node.

* * * * *